(12) United States Patent
Stanfield

(10) Patent No.: US 11,600,996 B2
(45) Date of Patent: Mar. 7, 2023

(54) ELECTRIC VEHICLE (EV) FAST RECHARGE STATION AND SYSTEM

(71) Applicant: THE NOCO COMPANY, Glenwillow, OH (US)

(72) Inventor: James Richard Stanfield, Glendale, AZ (US)

(73) Assignee: The NOCO Company, Glenwillow, OH (US)

( * ) Notice: Subject to any disclaimer, the term of this patent is extended or adjusted under 35 U.S.C. 154(b) by 201 days.

(21) Appl. No.: 16/984,817

(22) Filed: Aug. 4, 2020

(65) Prior Publication Data
US 2020/0366104 A1 Nov. 19, 2020

Related U.S. Application Data

(63) Continuation-in-part of application No. 16/018,411, filed on Jun. 26, 2018, now Pat. No. 10,730,396, which is a continuation of application No. PCT/US2018/024058, filed on Mar. 23, 2018.

(60) Provisional application No. 62/476,499, filed on Mar. 24, 2017.

(51) Int. Cl.
| | | |
|---|---|---|
| H02J 7/00 | (2006.01) | |
| B60L 50/40 | (2019.01) | |
| H01M 10/052 | (2010.01) | |

(52) U.S. Cl.
CPC ............ *H02J 7/0018* (2013.01); *B60L 50/40* (2019.02); *H01M 10/052* (2013.01); *H01M 2220/20* (2013.01)

(58) Field of Classification Search
CPC ....................................................... H02J 7/00
See application file for complete search history.

(56) References Cited

U.S. PATENT DOCUMENTS

| | | |
|---|---|---|
| 2007/0144605 A1 | 6/2007 | Horowitz et al. |
| 2011/0055037 A1 | 3/2011 | Hayashigawa et al. |
| 2012/0139480 A1 | 6/2012 | Kaneko |
| 2012/0212174 A1 | 8/2012 | Ishikawa et al. |
| 2012/0243958 A1 | 9/2012 | Guo |
| 2013/0049676 A1 | 2/2013 | Ishikawa et al. |
| 2013/0113413 A1 | 5/2013 | Harty |
| 2013/0221918 A1 | 9/2013 | Hill et al. |
| 2013/0257146 A1 | 10/2013 | Nojima et al. |
| 2014/0167694 A1 | 6/2014 | Gjinali et al. |
| 2014/0191718 A1 | 7/2014 | Reineccius et al. |
| 2016/0121735 A1 | 5/2016 | Sugano |
| 2016/0165716 A1 | 6/2016 | Ido et al. |
| 2016/0167678 A1 | 6/2016 | Jestin et al. |

(Continued)

FOREIGN PATENT DOCUMENTS

| | | |
|---|---|---|
| EP | 2 538 518 A1 | 12/2012 |
| JP | 2004-236469 A | 8/2004 |

(Continued)

OTHER PUBLICATIONS

Patent Cooperation Treaty, International Search Report, PCT/US2021/044321, dated Oct. 27, 2021.

*Primary Examiner* — Robert Grant
(74) *Attorney, Agent, or Firm* — Jones Day

(57) ABSTRACT

An electric vehicle (EV) charging station for fast charging (e.g. 5 to 15 minutes) an electric vehicle (EV). The EV charging station can be configured to charge multiple EVs and multiple conventional fuel type vehicles at the same time.

27 Claims, 18 Drawing Sheets

(56) References Cited

U.S. PATENT DOCUMENTS

| | | |
|---|---|---|
| 2016/0341773 A1 | 11/2016 | Reineccius et al. |
| 2018/0037121 A1* | 2/2018 | Narla .................. B60L 8/003 |
| 2018/0109120 A1* | 4/2018 | Nakao .................. H01M 10/44 |
| 2018/0215279 A1 | 8/2018 | Beekmann |
| 2018/0297477 A1 | 10/2018 | Stanfield |
| 2019/0168627 A1 | 6/2019 | Chen et al. |

FOREIGN PATENT DOCUMENTS

| | | |
|---|---|---|
| JP | 2008-308030 A | 12/2008 |
| JP | 2011-193716 A | 9/2011 |
| JP | 2012-34554 A | 2/2012 |
| JP | 2012-172500 A | 9/2012 |
| JP | 2013-27177 A | 2/2013 |
| JP | 2013-192310 A | 9/2013 |
| JP | 2014-230301 A | 12/2014 |
| JP | 2015-109724 A | 6/2015 |
| JP | 2016-111748 A | 6/2016 |
| WO | 2013/137232 A1 | 9/2013 |
| WO | 2014/068733 A1 | 5/2014 |
| WO | 2014/184729 A2 | 11/2014 |
| WO | 2015/083578 A1 | 6/2015 |
| WO | 2015/190123 A1 | 12/2015 |

* cited by examiner

ELECTRIC VEHICLE (EV) FAST RECHARGE STATION AND SYSTEM

FIELD

The present invention is directed to a fast or high speed electric vehicle recharge station and system, for example, for high speed recharging of electric vehicles (EVs). The fast or high speed electrical vehicle station and system can be configured to provide both high speed recharging of electric vehicles and filling of fuel powered vehicles.

BACKGROUND

Electric vehicles (EVs) have grown in use around the world with a strong interest in clean emissions, quiet driving, and low maintenance. Advancements in battery technology have supported improvements in vehicle speed as well as driving distance. Battery charging has improved to help support this growth and provide recharging times as low as two hours for a complete charge of large EV batteries (e.g. as in Chevrolet Volt or Tesla Model S). The push to improve recharge times has driven battery manufacturers to improve technology and provide "fast charge" capability in their batteries. The goal is to allow EV cars to recharge in close to the same time as refueling a gasoline vehicle (e.g. 10-15 minutes).

A problem arises with fast recharging of large vehicle batteries because of the large amount of AC Power required from the utility power grid for each (or multiple) vehicle(s) during recharge. For example, a normal size sedan such as a Chevrolet Volt could require power as high as 350 KW during the recharge process to achieve targeted recharge times. This power requirement when multiplied by several vehicles being charged simultaneously would require a huge AC Power source (such as utility power grid infrastructure to support a large industrial load, followed by AC/DC conversion) at the recharging site. This type of AC Power source is not available in most locations. The power surges during recharging also cause problems with the utility companies' ability to predict power requirements in specific locations. Adding to this particular problem is the sparse locations of recharge stations. EV recharge pumps must be available at gas stations to allow the EV market to grow.

SUMMARY

To provide sufficient power at most locations, power must be stored in a controlled, even manner using a large "electric reservoir" or "battery reservoir" or "energy reservoir" or "power reservoir." This electric reservoir can then be used as the main recharge energy source for recharging the electric vehicles. Battery technology already exists to support the "reservoir" requirement. Several different electric power storage technologies can be used including flow batteries, lithium-ion batteries, power storage capacitors (e.g. ultra capacitors) and/or fuel cells. Other electromechanical technologies such as flywheel energy storage can also be used. The electric reservoir can be placed underground in a similar fashion currently used for storing fuel (e.g. gasoline, diesel) in a gas station or it can be placed above ground.

The electric reservoir can be charged (e.g. constantly charged in an even manner) using power that already exists at a normal gas station. Using this method allows the utility company to predict the power usage and avoid power surges. For example, the electric reservoir can be recharged continuously, intermittently, variable current, variable charging rate, or in a programmed manner from an electrical power source (e.g. existing power source(s), new power source(s), electrical power grid, power transmission line(s), power distribution system, power station, electrical generator, fuel type electrical generator, solar panels, wind power generators).

The energy stored in the electric reservoir can be used as the power source for recharging the electric vehicle. A recharge pump, very similar (in physical size and form) to a regular gas pump can be used to make the proper conversion of power required for charging the EV. Since the power source for an EV is a DC battery and the electric reservoir can be a DC electric reservoir (e.g. DC flow battery, DC Li-ion battery), the power conversion required can simply be direct or a DC to DC conversion, avoiding the power losses with AC to DC conversions used in most battery chargers today.

The operator of the recharging station can charge customers for recharging their EVs in a manner similar to gasoline customers. They will be able to work with the utility company on the costs for keeping the reservoir charged as well as amortize the costs for adding/supporting the reservoir and EV Chargers or EV Pumps (e.g. electric chargers or outlets). The operator can build in profits required and charge the EV customers accordingly. This removes the burden for utility companies of having to provide industrial sized power grid infrastructure, such as additional towers, power lines, substations, which might be impractical for most locations.

Using a reservoir approach allows a normal gas station to be converted by simply adding an EV Pump (e.g. refueling EV pump) or multiple pumps to provide fast charging of EV(s). This fast charging will allow EV(s) to easily travel across country just like a gasoline fueled vehicle does today, which will allow EV(s) to become more mainstream.

The presently described subject matter is directed to a station for refueling fuel vehicles and/or recharging electric vehicles.

The presently described subject matter is directed to an electric recharge station.

The presently described subject matter is directed to an electric/fuel station.

The presently described subject matter is directed to an improved gas station comprising or consisting of both gas pumps and electric pumps or EV chargers.

The presently described subject matter is directed to an electric recharge/fuel station comprising or consisting of at least one fuel pump and at least one electric pump or EV charger.

The presently described subject matter is directed to an electric recharge/fuel station comprising or consisting of at least one fuel pump and at least one electric pump or EV charger.

The presently described subject matter is directed to an electric recharge/fuel station comprising or consisting of at least one fuel pump and at least one electric pump or charger, wherein the at least one fuel pump is spaced apart a predetermined distance from the at least one electric pump or charger.

The presently described subject matter is directed to an electric recharge/fuel station comprising or consisting of at least one fuel pump and at least one electric pump or charger, wherein the at least one fuel pump and at least one electric pump or charger are provided in a single unit.

The presently described subject matter is directed to a fuel/electric station comprising or consisting of at least one fuel pump and at least one electric pump or charger, wherein the at least one fuel pump and at least one electric pump or charger are separate units.

The presently described subject matter is directed to a fuel/electric station comprising or consisting of multiple fuel pumps and multiple electric pumps or EV chargers.

The presently described subject matter is directed to a fuel/electric station comprising or consisting of multiple fuel pumps locate and multiple electric pumps or chargers, wherein the fuel pumps are located in at least one row and the electric pumps or chargers are located in at least one another row.

The presently described subject matter is directed to a fuel/electric station comprising or consisting of at least one electric reservoir.

The presently described subject matter is directed to a fuel/electric station comprising or consisting of multiple electric reservoirs.

The presently described subject matter is directed to a fuel/electric station comprising or consisting of at least one onsite electric reservoir.

The presently described subject matter is directed to a fuel/electric station comprising or consisting of at least one electric reservoir located below ground level.

The presently described subject matter is directed to a fuel/electric station comprising or consisting of multiple electric reservoirs located below ground level.

The presently described subject matter is directed to a fuel/electric station comprising or consisting of at least one electric reservoir located above ground level.

The presently described subject matter is directed to a fuel/electric station comprising or consisting of multiple electric reservoirs located above ground level.

The presently described subject matter is directed to a fuel/electric station comprising or consisting of at least one electric reservoir.

The presently described subject matter is directed to a fuel/electric station comprising or consisting of multiple electric reservoirs.

The presently described subject matter is directed to a fuel/electric station comprising or consisting of at least one onsite electrical reservoir.

The presently described subject matter is directed to a fuel/electric station comprising or consisting of multiple onsite electric reservoirs.

The presently described subject matter is directed to a fuel/electric station comprising or consisting of at least one electrical reservoir located below ground level.

The presently described subject matter is directed to a fuel/electric station comprising or consisting of multiple electric reservoirs located below ground level.

The presently described subject matter is directed to a fuel/electric station comprising or consisting of at least one electric reservoir located above ground level.

The presently described subject matter is directed to a fuel/electric station comprising or consisting of multiple electric reservoirs located above ground level.

The presently described subject matter is directed to a fuel/electric station comprising or consisting of at least one fuel tank and at least one electrical reservoir located below ground level.

The presently described subject matter is directed to a fuel/electric station comprising or consisting of multiple fuel tanks and multiple electric reservoirs located below ground level.

The presently described subject matter is directed to a fuel/electric station comprising or consisting of at least one gas tank and at least one electric reservoir located below ground level, wherein the at least one gas tank and at least one electric reservoir are spaced apart at least a predetermined distance.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir.

The presently described subject matter is directed to an electric vehicle (EV) charging station for charging an electric vehicle (EV), the EV charging station comprising or consisting of at least one power source; a plurality of electrical services receiving power from the at least one power source; a plurality of primary electric reservoirs receiving power, respectively, from the plurality of electrical services; a plurality of secondary electric reservoirs receiving power, respectively, from the first primary electric reservoirs; and a plurality of EV chargers receiving power, respectively, from the plurality of secondary electric reservoirs.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir, further comprising a tertiary electric reservoir receiving power from the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir, wherein the electrical service is a plurality of electrical services, the primary electric reservoir is a plurality of primary electric reservoirs receiving power, respectively, from the plurality of electrical services, the secondary electric reservoir is a plurality of secondary electric reservoirs receiving power, respectively, from the plurality of primary electric reservoirs, and the EV charger is a plurality of EV chargers receiving power, respectively, from the plurality of secondary electric reservoirs.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, wherein the electrical service is a plurality of electrical services, the primary electric reservoir is a plurality of primary electric reservoirs receiving power, respectively, from the plurality of electrical services, the secondary electric reservoir is a plurality of secondary electric reservoirs receiving power, respectively, from the plurality of electric primary electric reservoirs, the tertiary electric reservoir is a plurality of tertiary electric reservoirs receiving power, respectively, from the plurality of secondary electric reservoirs, and the EV charger is a plurality of EV chargers receiving power, respectively, from the plurality of tertiary electric reservoirs.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir, further comprising an AC to DC power converter receiving AC power from the electrical service and converting the AC power to DC power.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir, further comprising a second DC to DC power converter receiving DC power from the primary electric reservoir and converting the DC power to DC power for supplying DC power to the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir, further comprising a second DC to DC power converter receiving DC power from the primary electric reservoir and converting the DC power to DC power for supplying DC power to the secondary electric reservoir, further comprising a third DC to DC power converter receiving DC power from the secondary electric reservoir and converting the DC power to DC power for supplying DC power to the EV charger.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir, further comprising a second DC to DC power converter receiving DC power from the primary electric reservoir and converting the DC power to DC power for supplying DC power to the secondary electric reservoir, further comprising a third DC to DC power converter receiving DC power from the secondary electric reservoir and converting the DC power to DC power for supplying DC power to the EV charger, wherein the EV charger comprises a fourth DC to DC power converter for converting DC power to DC power for supplying DC power to the EV.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, further comprising an AC to DC power converter receiving AC power from the electrical service and converting the AC power to DC power.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir, further comprising a second DC to DC power converter receiving DC power from the primary electric reservoir and converting the DC power to DC power for supplying DC power to the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir, further comprising a second DC to DC power converter receiving DC power from the primary electric reservoir and converting the DC power to DC power for supplying DC power to the secondary electric reservoir, further comprising a third DC to DC power converter receiving DC power from the secondary electric reservoir and converting the DC power to DC power for supplying DC power to the tertiary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir, further comprising a second DC to DC power converter receiving DC power from the primary electric reservoir and converting the DC power to DC power for supplying DC power to the secondary electric reservoir, further comprising a third DC to DC power converter receiving DC power from the secondary electric reservoir and converting the DC power to DC power for supplying DC power to the tertiary electric reservoir, further comprising a third DC to DC power converter receiving DC power from the tertiary electric reservoir and converting the DC power to DC power for supplying DC power to the EV charger.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, further comprising an AC to DC power converter receiving AC power from the electrical service and converting the AC power to DC power, further comprising a first DC to DC power converter receiving DC power from the AC to DC converter and converting the DC power to DC power for supplying DC power to the primary electric reservoir, further comprising a second DC to DC power converter receiving DC power from the primary electric reservoir and converting the DC power to DC power for supplying DC power to the secondary electric reservoir, further comprising a third DC to DC power converter receiving DC power from the secondary electric reservoir and converting the DC power to DC power for supplying DC power to the tertiary electric reservoir, further comprising a third DC to DC power converter receiving DC power from the tertiary electric reservoir and converting the DC power to DC power for supplying DC power to the EV charger, wherein the EV charger comprises a fifth DC to DC power converter for converting DC power to DC power for supplying DC power to the EV.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, wherein the primary electric reservoir comprises a flow battery.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, wherein the primary electric reservoir comprises a Li-ion battery.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, wherein the primary electric reservoir comprises an electrical storage capacitor.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; and a first EV charger receiving power from the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, wherein the EV charging station is configured to selectively or simultaneously provide power for charging the EV from the electrical source, primary electric reservoir and/or the secondary electric reservoir.

The presently described subject matter is directed to an electric vehicle (EV) charging station for charging an electric vehicle (EV), the EV charging station comprising or consisting of: a power source; an electrical service receiving power from the power source; a primary electric reservoir receiving power from the electrical service; a secondary electric reservoir receiving power from the primary electric reservoir; a tertiary electric reservoir receiving power from the secondary electric reservoir; and a first EV charger receiving power from the tertiary electric reservoir, wherein the EV charging station is configured to selectively or simultaneously provide power for charging the EV from the electrical source, the primary electric reservoir, second electric reservoir and/or the tertiary electric reservoir.

DETAILED DESCRIPTION

Figure 1:
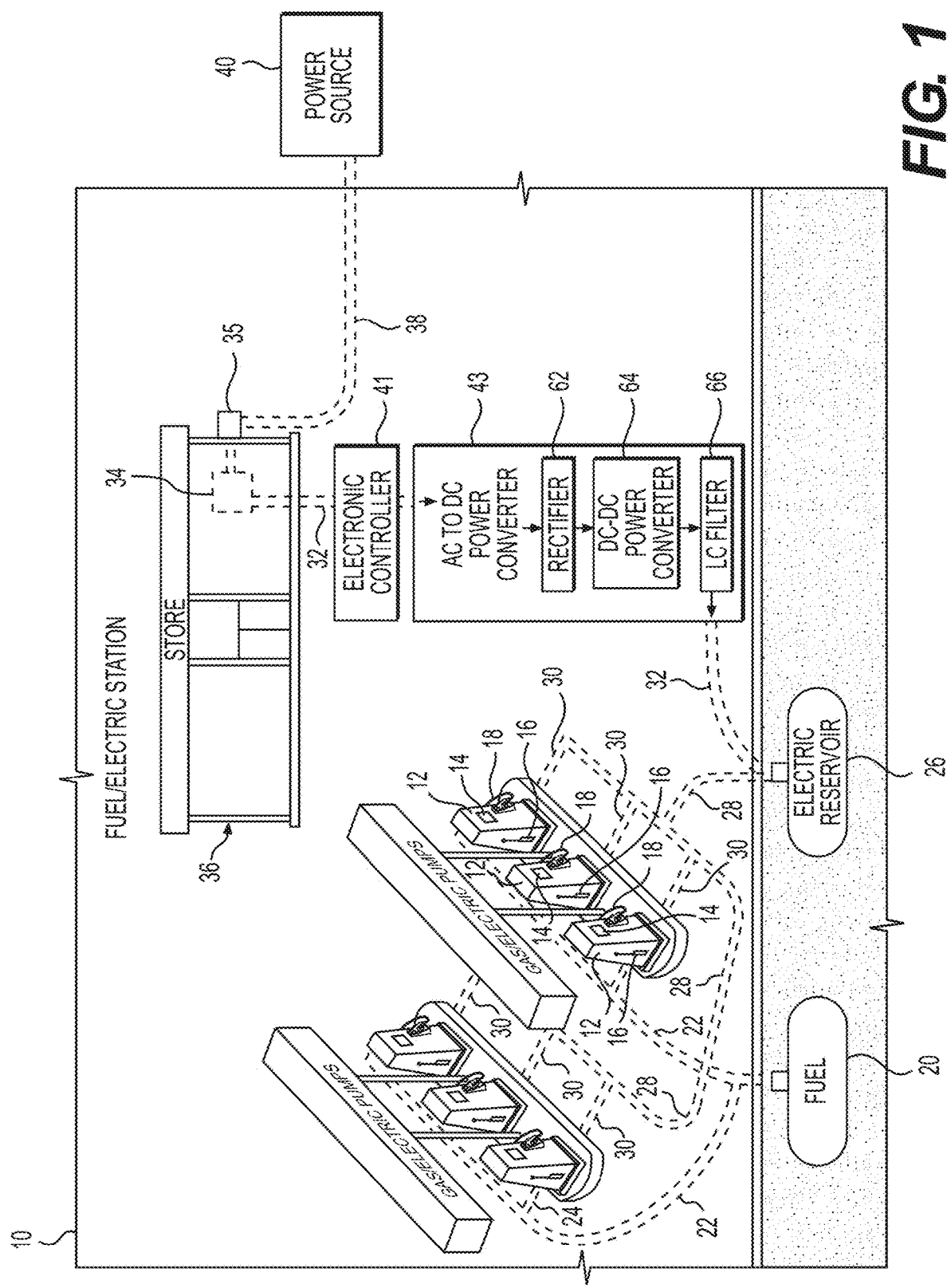
FIG. 1 is a diagrammatic view of a fuel/electric station according to the present invention.
Figure 2:
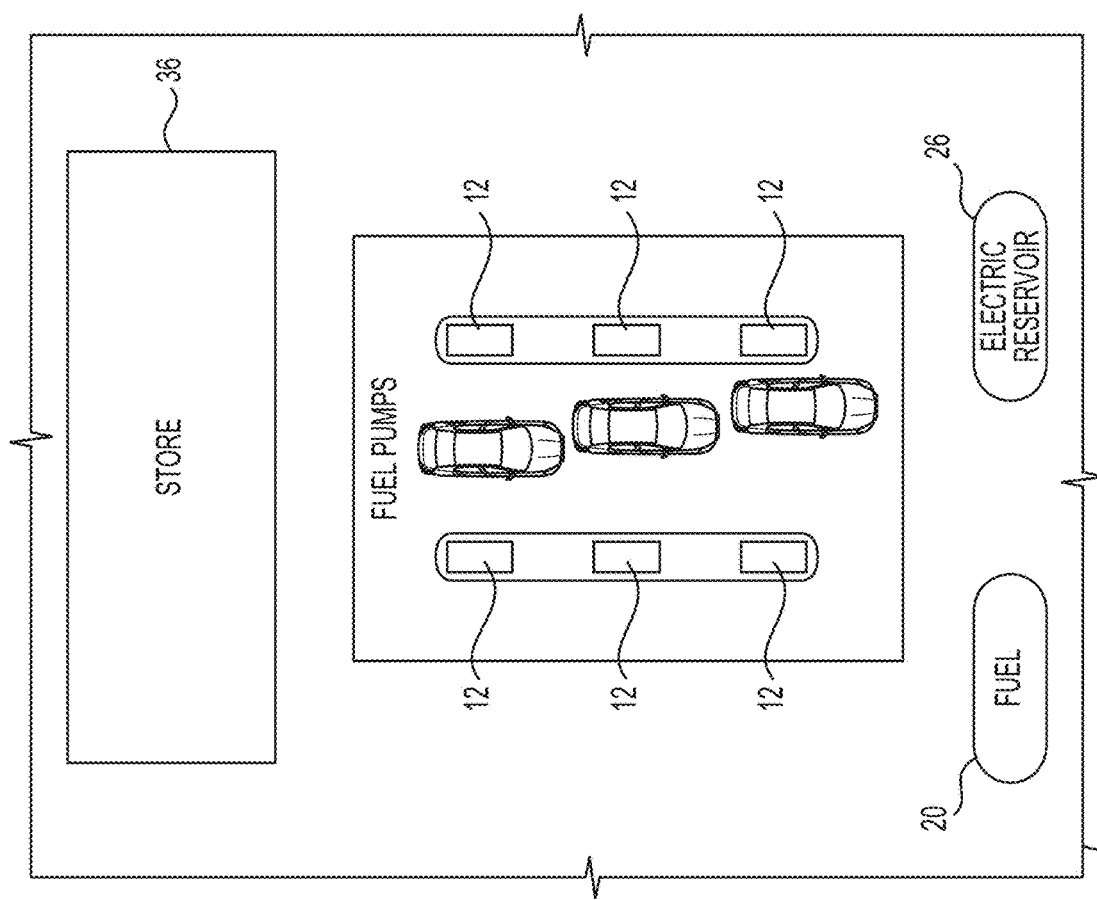
FIG. 2 is another diagrammatic view of the fuel/electric station shown in FIG. 1.

A fuel/electric station 10 (e.g. gasoline/electric station) according to the present invention is shown in FIGS. 1 and 2. The fuel/electric station 10 is structured, arranged, and designed to both dispense fuel (e.g. gas, diesel, propane, liquid propane, hydrogen) and recharge electric vehicles (EVs).

The fuel/electric station 10 comprises multiple fuel/electric pumps 12 (e.g. gasoline pumps). The fuel/electric pumps 12 each comprise an electric vehicle charger or EV charger for recharging EVs and a fuel pump for refueling fuel type vehicles with fuel (e.g. gasoline, diesel, gas, propane, liquid propane, hydrogen). The fuel/electric pumps 12 each can comprise electrical components such as electrical components for charging EVs (e.g. EV charger, DC-DC converter, battery, Li-ion battery, power storage capacitors, fuel cells) and for refueling conventional fuel type vehicles, for example, having internal combustion engines (e.g. fuel pump, fuel meter, fuel filter, electrical control), for example, within a housing or compartment(s) of the fuel/electric pumps 12. The fuel/electric pumps 12 can include cooling equipment (e.g. fan, refrigeration, cooling circulation system), for example, to remove heat from housing, compartments, and electrical components.

The fuel/electric pumps 12 are shown in FIG. 1 as three (3) fuel/electric pumps 12 per row with two (2) rows. However, more or less fuel/electric pumps 12 can be provided in the rows, or more or less rows can exist.

Figure 7:
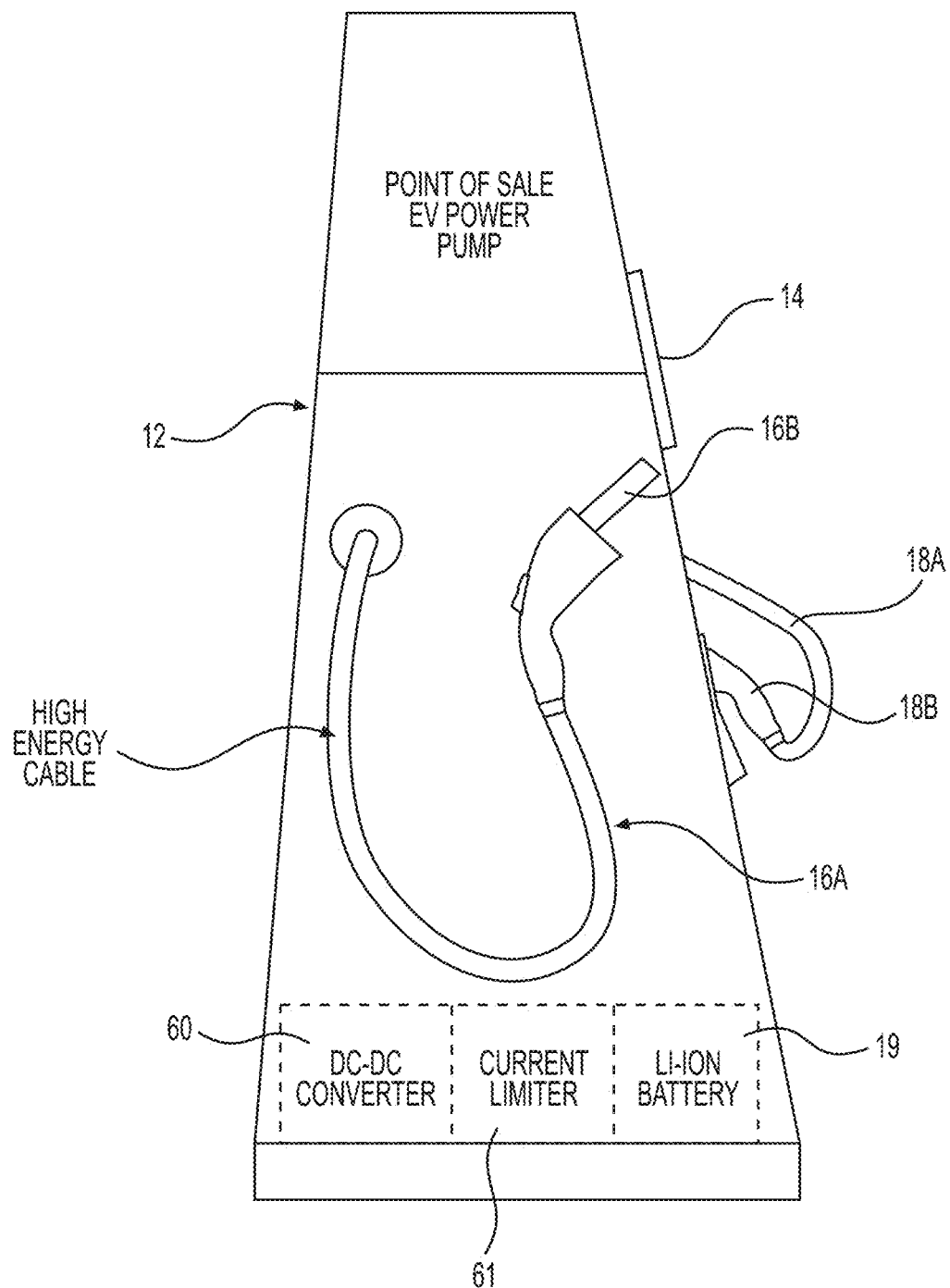
FIG. 7 is a side elevation view of a fuel/electric pump according to the present invention.

As shown in FIG. 7, the fuel/electric pumps 12 each have a display 14, electric charging cable 16A with an electrical connector 16B configured for EV hook up and recharging, a gas hose 18A fitted with a gas nozzle 18B, a DC-DC converter 60, a current limiter 61, and an internal Li-ion battery 19 (e.g. battery, batteries, power storage capacitors, fuel cells). Alternatively, the fuel/electric pumps 12 can be structured or configured as electric pumps configured to only charge EVs (i.e. "electric charging only" pumps) or structured or configured as fuel pumps configured to only pump fuel (i.e. "fuel filling only" pumps). The fuel pumps (e.g. gasoline pumps) can be spaced apart from the electric pumps comprising or consisting of EV chargers in various arrangements and/or locations on the premises of the fuel/electric station 10.

Again, the fuel/electric pumps 12 shown comprise the components or parts for both pumping gas and EV charging. For example, the fuel/electrical pumps 12 can comprise the Li-ion battery 19, power storage capacitors, fuel cells, electronic controller configured to control voltage and current supplied by the Li-ion battery 19 to the electric vehicle (EV), fuel pump components, and/or safety electronics (e.g. stop all dispensing, stop EV charging, stop fuel pumping, trigger Halon fire system, electrical spark suppression, operational lock out detection and controls for "fuel filling only" filling mode or "electric charging only" charging mode).

Again, the arrangement shown in FIGS. 1 and 2, can be modified with the rows of fuel/electric pumps 12 shown replaced with one or more rows of "fuel filling only" pumps and one or more rows of "electric charging only" pumps physically spaced apart and separate same for safety reasons (e.g. to prevent fuel vapor in proximity to electric equipment and potential electrical sparks). However, the fuel/electric pumps 12 can be configured or designed to provide electric spark suppression, high level of electrical grounding, redundant electrical grounding, separate compartments or containment structures for separate gas and electric operations, air venting or air or gas (e.g. nitrogen) circulation pumps, fans, and/or refrigeration to allow both gas and electric operations within the same fuel/electric pumps 12. Again, the fuel/electric pumps 12 can be configured or designed to only allow one mode of operation at a time, for example, with a time pause in-between operations to allow air venting or circulations pumps to remove any remaining fuel or fuel vapor to atmosphere after gas operation mode.

The fuel/electric station 10 comprises an underground fuel storage tank 20 connected to the individual fuel/electric pumps 12 via a main fuel supply line 22 connected to and supplying individual fuel lines 24 (i.e. fuel distribution arrangement and system). The fuel/electric station 10 further comprises an underground electric reservoir 26 connected to the individual fuel/electric pumps 12 via a main power line 28 connected to and supplying individual electric lines 30 (i.e. electric distribution arrangement and system). The fuel/electric station 10 is anticipated to provide high speed recharging of electric vehicles (e.g. configured to recharge electrical vehicles (EVs) in 5 to 15 minutes) in a similar time frame to filling up a vehicle with fuel.

As an alternative to the fuel/electric station 10 shown in FIGS. 1 and 2, multiple fuel tanks 20 and/or multiple electric reservoirs 26 can be provided at the fuel/electric station 10 to meet greater and/or peak demands. For example, the fuel/electric station can comprise or consist of multiple power subunits each comprising an electrical reservoir and multiple fuel/electric pumps 12.

The electric reservoir 26 can be an apparatus or device configured to store a large amount of electric power. For example, the electric reservoir 26 can be a battery, flow battery, Li-ion battery, Li-ion battery array (e.g. banks of batteries), power storage capacitors (e.g. ultra capacitors) and/or fuel cells. For example, the electric reservoir 26 can be a large flow battery or multiple Li-ion batteries (e.g. located adjacent to the fuel/electric pumps 12, located internally within fuel/electric pumps, and configured to fast charge EVs). The electric reservoir 26 can be designed, constructed, and sized to accommodate demand based upon the forecasted number of EVs to be recharged hourly, daily, weekly, monthly, and yearly schedules.

The electric reservoir 26 is supplied power via underground power line 32 connected to an electric service 34 (e.g. electrical service panel), for example, located in store 36. A high power service line 38 supplies power from a power source 40 (e.g. power grid, power station, transmission line, transmission station, generator(s), fuel generator(s), solar panel(s), wind power generator(s)). A power meter 35 (e.g. located on side of store 36) can be provided to meter the incoming power from the power source 40.

Further, an electronic controller 41 can be provided in the power line 32 for controlling the charging of the electric reservoir 26 via the power line 32. For example, the electronic controller 41 can be a component or part of the electric reservoir 26 or a separate component or part (e.g. located on the premises of the fuel/electric station 10). The electronic controller 41, for example, can be a programmable electronic controller.

Figure 3:
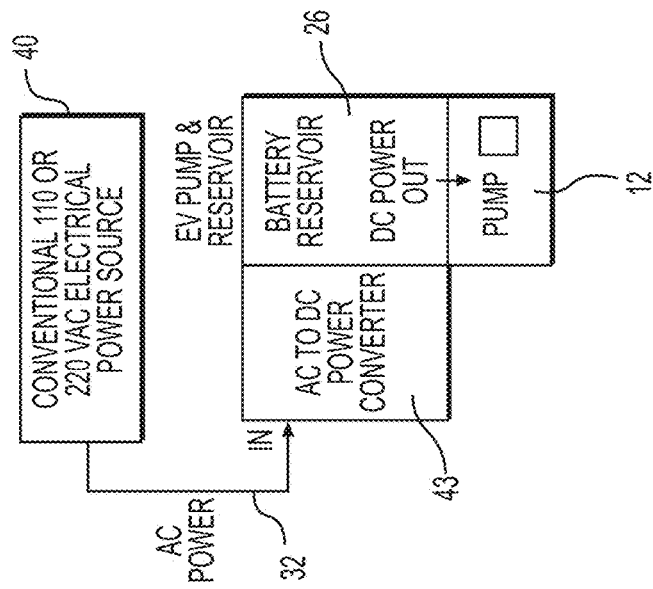
FIG. 3 is a diagrammatic view of the structure and arrangement of the fuel/electric station shown in FIG. 1.

In addition, an AC/DC converter 43 can be provided in the power line 32 for converting the incoming AC power into DC power for charging of the electric reservoir 26 via the power line 32, as shown in FIGS. 1 and 3. For example, the AC/DC converter 43 can be a component or part of the electric reservoir 26 or a separate component or part (e.g. located on the premises of the fuel/electric station 10).

The electric reservoir 26 can be recharged in various manners. For example, the electric reservoir 26 is continuously charged, intermittently charge, variably charged, charged on demand, and/or charged according to a program or algorithm. For example, the charging strategy can be to charge the electric reservoir 26 in a manner reducing or minimizing the demand (e.g. avoiding peak demand on the power source 40) while meeting the demand for charging the forecasted number of electric vehicles throughout the daily schedule. The program or algorithm can be configured to learn and store data on the amount of demand at a given time during each particular day throughout the year, season (e.g. summer, fall, winter, and spring), and holidays to update and improve the forecast for demand in the future.

The charging of the electric reservoir 26 can involve continuous charging the electric reservoir 26 at an even or varying rate. Alternatively, the electric reservoir 26 can be intermittently recharged at a fixed rate, and/or charged at different rates at different period of time. In any event, the intent is to structure and arrange the fuel/electric station 10 to provide enough power availability to always meet peak demands for recharging EVs at the fuel/electric station 10 while minimizing peak power demands on the power source 40.

Figure 4:
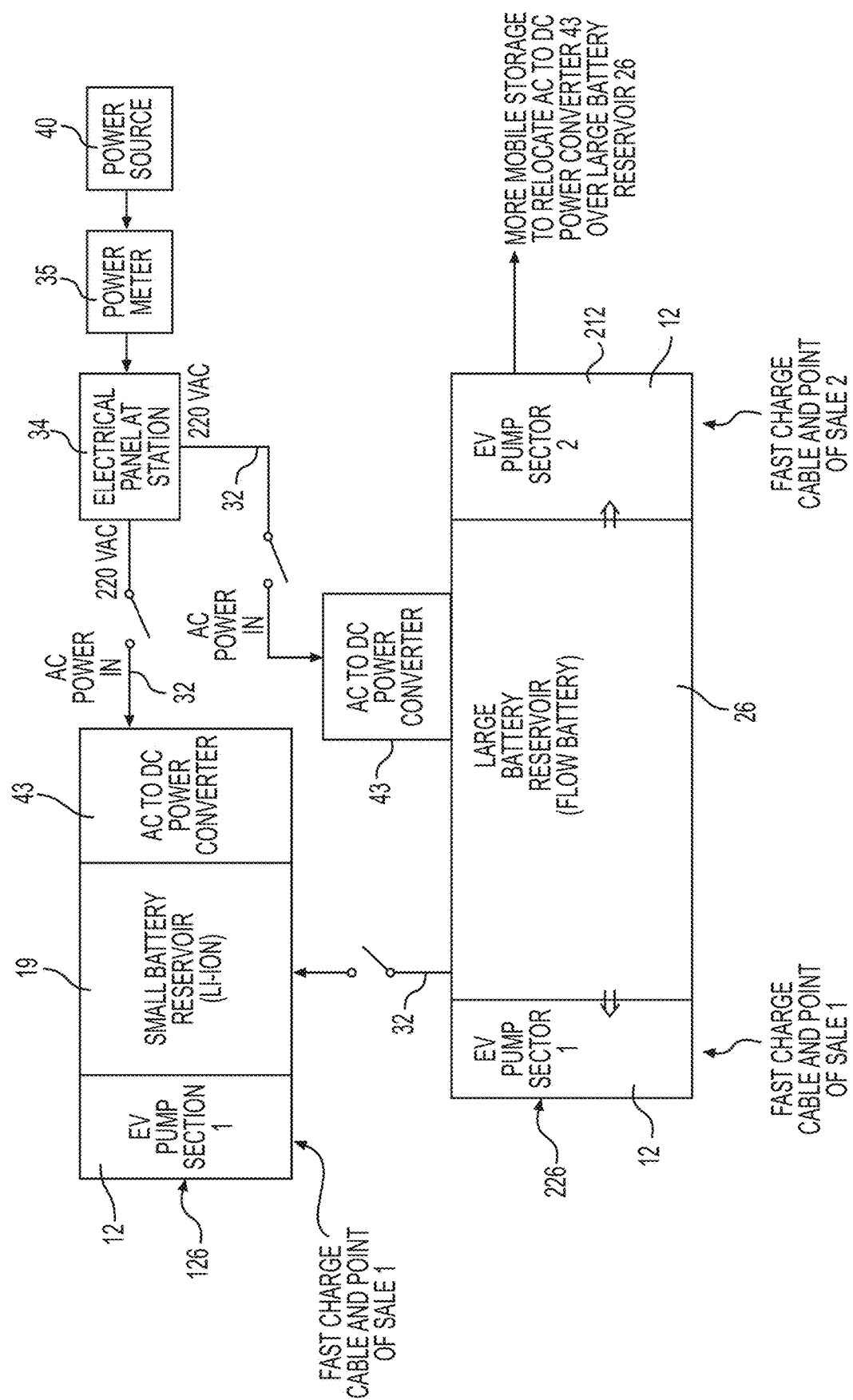
FIG. 4 is a diagrammatic view of the structure and arrangement of a fuel/electric station, for example, a portable fuel/electric station for use with the fuel/electric station shown in FIG. 1, or for use on a lot, for example, at a remote location.

The fuel/electric station 10 is shown in FIGS. 1-3, and/or another operation (e.g. a lot located at a different location, for example, a remote location) can be fitted with electrical power units 126, 226, as shown in FIG. 4. The electrical power units 126, 226 shown are structured and arranged for providing electric recharging only; however, the units 126, 226 can be modify to provide both fuel refueling for conventional fuel type vehicles or electric recharging for EVs. The electric power units 126, 226 can be connected to and powered, for example, by electric panel 34 of the fuel/electric station 10.

The portable version of electric power units 126, 226 can be portable electric power units. For example, a 20 foot mobile storage container can be fitted with an electric charging only pump 12, and a 40 foot mobile storage container can be fitted with two (2) electric charging only pumps 12. The portable power units 126, 226 can be transported to a site (e.g. new station site, local station site, remote station site), and connected up to start operations. The portable version of the electric power units 126, 226 can be particularly useful for providing temporary operation, remote operation, and provide inexpensive, reusable, or repositionable operation.

Figure 5:
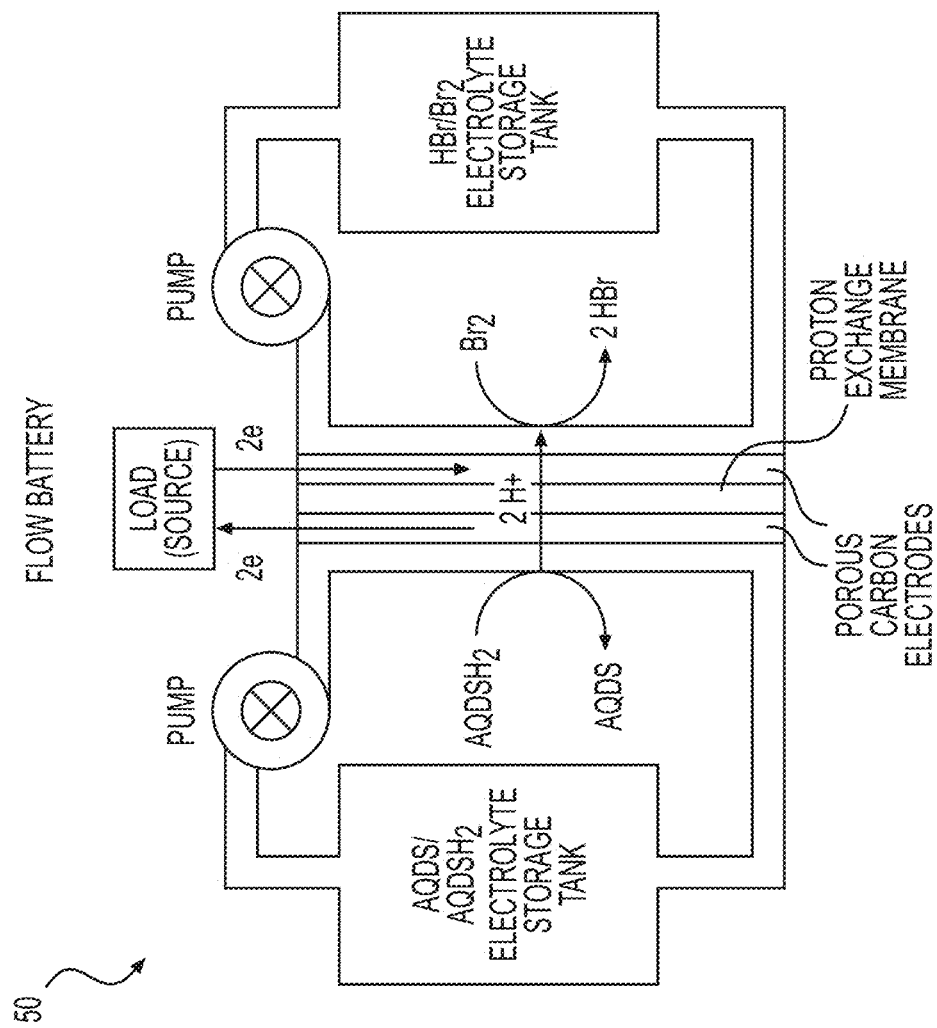
FIG. 5 is a diagrammatic view of a flow battery for use in the fuel/electric stations shown in FIGS. 1-3.

The electric reservoir 26 shown in FIGS. 1-3, for example, can be a flow battery 50 shown in FIG. 5. Specifically, the flow battery 50 can be structured, configured, and or designed for use as the electric reservoir 26 in the fuel/electric station 10 shown in FIGS. 1-3 or the portable versions of the electric power units 126 and 226 shown in FIG. 3.

The flow battery 50, for example, comprises an AQDS/AQDSH electrolyte storage tank having a circulating pump, and an HBr/Br$_2$ electrolyte storage tank having another circulating pump along with a pair of spaced apart porous carbon electrodes separated by a proton exchange membrane. The flow battery 50 is connected to the electrical supply cable 32 (electric source) and the main power supply cables 22 leading to the fuel/electric pumps 12 to supply same.

Figure 6:
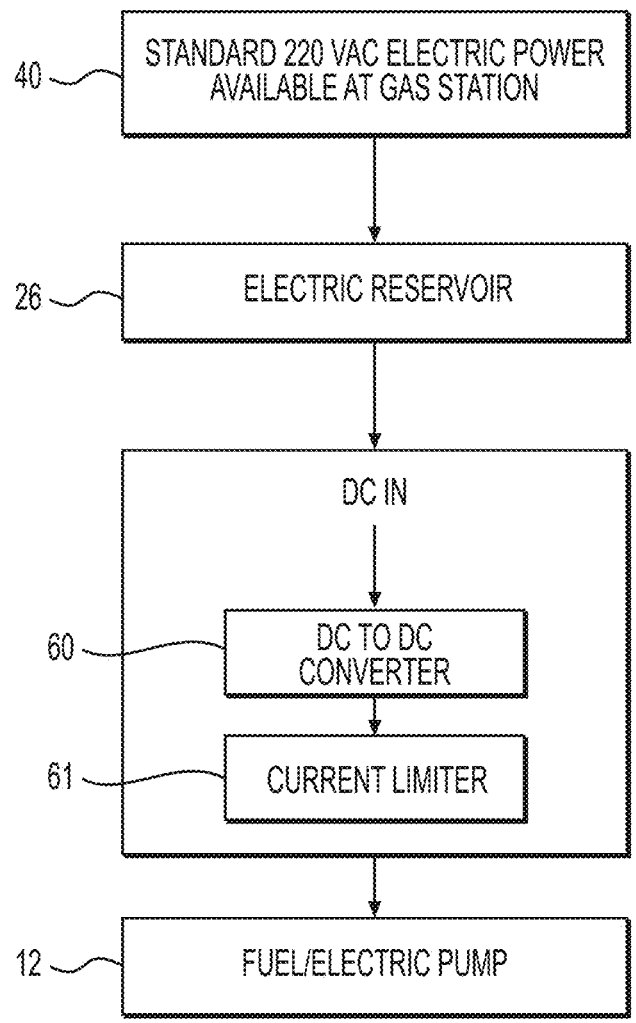
FIG. 6 is a flow chart showing power flow from the electric reservoir (e.g. flow battery, Li-ion battery, power storage capacitors, fuel cells) to the fuel/electric pump (e.g. EV pump, EV charger, and/or fuel pump).

As shown in FIG. 6, at least one DC to DC converter 60 can receive power from the electric reservoir 26 and then supply power to the fuel/electric pumps 12. The converter 60 can be a component or part of the electric reservoir 26 and/or a component or part of the fuel/electric pumps 12.

Flow Battery

Again, the electric reservoir 26 can be a one or more flow batteries 50. The open circuit voltage of a redox flow battery cell stack is directly proportional to the number of stacks in series, like any other battery.

For charging an EV battery, the voltage provided by the flow battery 50 must be adjustable to the level to which the EV battery needs to be charged to (e.g. may assume several different intermediate levels during the charge process). A properly designed DC-DC converter 60 (e.g. housed in the fuel/electric pump 12, as shown in FIG. 7) with appropriate sensing and feedback mechanisms, following the flow battery, provides for the desired voltage to charge the EV battery. For example, Tesla Model S has a battery voltage of approximately 350 Vdc.

The voltage available from the electric reservoir 26 (e.g. flow battery 50) itself will depend on its configuration (i.e. number of cells in a stack, number of stacks in series). For instance, the following has been demonstrated with Vanadium flow batteries installed in 2009, including 3 cell stacks with 40 cells in each stack. The stacks are electrically connected in series, which gives a potential of about 165 V (Risø National Laboratory for Sustainable Energy Report, Risø-R-1753(EN), February 2011, Technical University of Denmark).

This voltage may be increased by adding more cell stacks in series. Another way to increase the voltage to the desired charge level is to use a power electronic boost converter in the DC-DC converter 60 present at the fuel/electric pump 12. The choice of topology to get to the desired charge voltage will depend on the economics of each option and the physical space (real estate) required by each option.

The output voltage of the DC-DC converter 60 will depend on the EV model being charged, which may have vastly different battery voltages or charge port form factor. It is conceivable that the DC-DC converter power electronics may be able to provide the required voltage level for a certain range of battery voltages. If the EV battery voltage requirement is beyond what a single DC-DC converter 60 design can provide or an entirely different charge port form factor, then a different pump type 212 will need to be provided, interfacing the same electric reservoir 26 (e.g. flow battery 50).

Any EV battery will need to be charged at a current level recommended by its manufacturer, which must not exceed a maximum current level to protect the EV battery and to limit the voltage drop in the cables connecting to the charge inlet port on the EV. The current limit function in the DC-DC converter 60 will provide that protection.

If the output voltage of the electric reservoir 26 (e.g. flow battery 50) is higher than the EV battery voltage, then the DC-DC converter 60 will be of the "buck" type, consisting of either MOSFET or IGBT type power electronic switches. Due to the high current involved during fast charging, it would be preferred to operate the switches with a low loss switching approach, such as "zero-voltage switching" and synchronous rectification. The DC-DC converter 60 would then simply consist of the power electronic switches arranged in a "half-bridge" followed by a current limiter 61 (e.g. LC filter) to reduce the voltage ripple caused by the power electronic switching mechanism.

If the output voltage of the electric reservoir 26 (e.g. flow battery 50) is lower than or close to the EV battery voltage, then the DC-DC converter 60 will have a first "boost" stage, followed by a "DC link" capacitor, followed by a "buck" stage and the LC filter. The "boost" stage steps up voltage available from the flow battery to a higher voltage, which is then down-converted to the EV battery voltage as required during the charge process. The operation of both the boost and buck stage would again be done while minimizing the losses in the converter.

The AC-DC power converter 43 located after the AC power source 40 supplying the electrical panel 40 or the cable 32 can incorporate a rectifier 62 stage followed by a DC-DC converter 64 stage. The rectifier 62 stage is needed to convert the AC voltage to a DC voltage. The DC-DC converter 64 or converter stage is required to convert the rectified (DC) voltage to the electric reservoir 26 voltage, as required during its charging process. The rectifier stage is typically of the full bridge "controlled rectifier" type implemented using MOSFET or IGBT type switches. The rectifier stage will be controlled to achieve "power factor correction" on its AC side to meet the power quality requirement set by the utility. The DC-DC converter 64 stage may be a "buck" type or a "boost" followed by a "buck" type, depending on whether the flow battery voltage is lower or higher, respectively, than the rectified voltage. The DC-DC converter 64 stage can include an LC filter 66 to remove the voltage ripple caused by the power electronic switching mechanism. Again, the power electronic switches will need to be operated to minimize the losses.

EV Power Pump High Energy Cable

The high energy cable 16A of the fuel/electric pump 12 (FIG. 7) will be capable of safely delivering 350 KW of power to recharge the electric vehicles. Large copper cables must be used to manage this much power. The power will be a combination of voltage and current. Electric vehicles today are being built using batteries as high as 350-400 VDC. In the future, this voltage is going to be higher to support longer driving distances as well as faster speeds. The charge currents are expected to be 400-500 amps to provide Fast Charge success.

The charge cable must be made using 0000AWG (approximately 0.5" diameter) or larger diameter to handle the charge currents required. The interface to the vehicle must be large conductors also. One large cable or two smaller cables can be used to provide the necessary power delivery. The advantage of two cables is they would make it easier to handle between the EV power pump and the EV. The two cables connection can also be used as a safety key for the charging process. More specifically, the EV power pump must detect solid connections of both conductors to enable the charge process to begin. An "electronic safety key/lock" will also be used to insure that the connection to the pump is a valid EV ready to be charged. This safety key can be part of the pumps safety software and the EV must provide a valid response in order for the pump to be enabled. In this way, the pump will never turn high power on to the cables unless it safely and clearly determines that a valid EV is connected and ready to charge.

The conductors between the EV power pump and the EV must be made of highly conductive heavy gauge metal such as copper or silver and must be a low corrosion type. The connectors at the end of the high energy cable 16A must not have any exposed metal parts for safety purposes, and if two cables are used the cables must be either interchangeable or must be keyed so they cannot be improperly inserted or connected.

Using high conductive cables and contacts will insure minimum energy losses during the critical charge process. It is very important that maximum energy (i.e. power times time) is delivered during the charge process.

Charge interruption safety will also be provided to protect against accidents such as a person trying to drive away during the charge process or even environmental accidents such as earthquakes. An Inhibit signal will be provided from the pump that the EV manufacturer can use to disable the EV from driving during the charge process. But just in case the cable is accidentally pulled out of the pump during the charge process, the pump will detect this condition and shut power off so that it is not available to the outside world.

A master shut off lever will also be provided that turns power off from the Battery Reservoir for safety purposes.

Maximum Power Sharing

Figure 8:
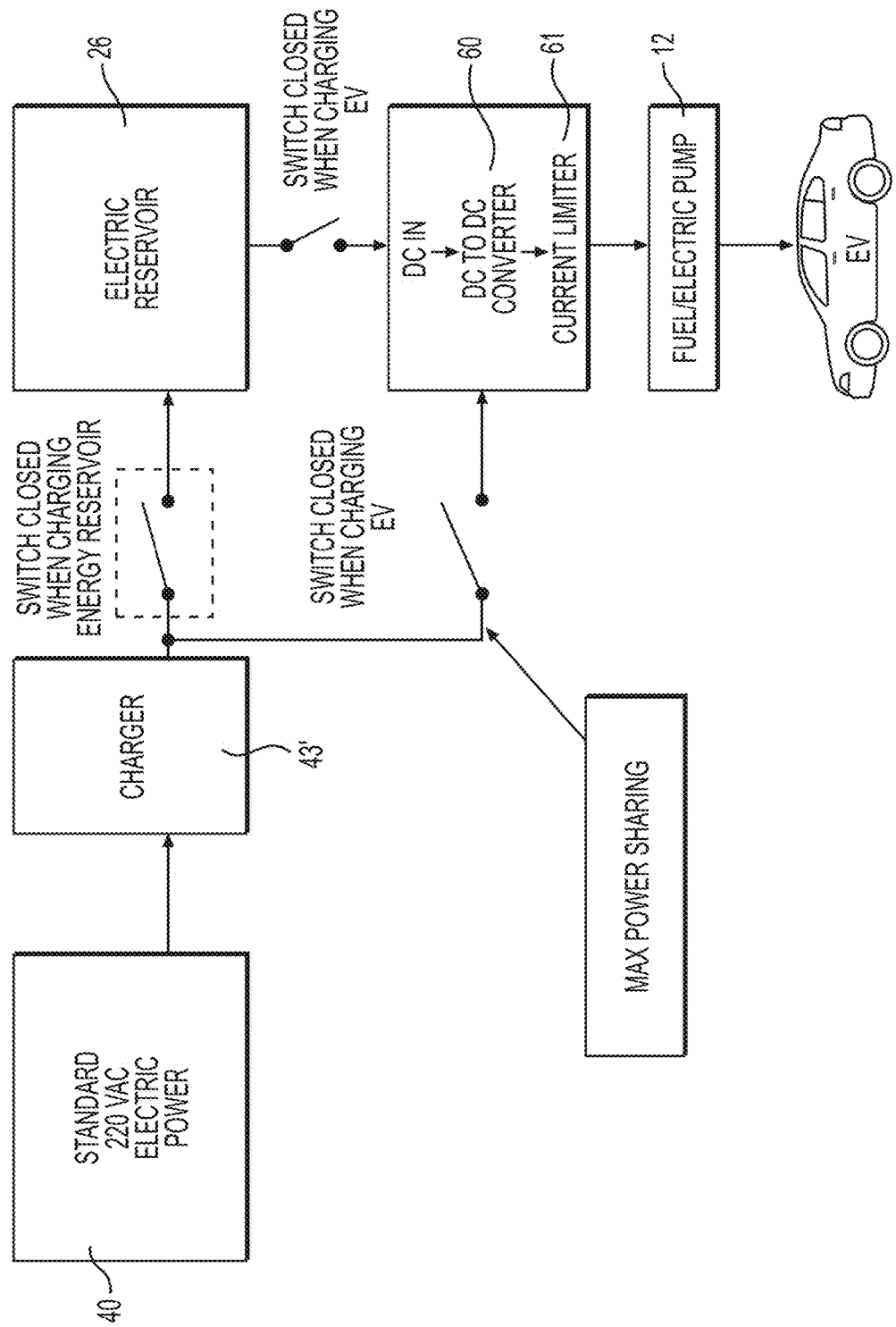
FIG. 8 is a diagrammatic view showing power sharing of the charging of an EV from the power source and the electric reservoir.

The high speed electric vehicle recharge station and system according to the present invention can include a maximum power sharing function between charging the energy reservoir and charging the EV, as shown in FIG. 8.

If the electric reservoir 26 used is a Redox Flow Battery 50, it cannot be charged while delivering power to the output. This is because the pump flow changes direction accordingly. Because of this limitation, it is possible to utilize the extra power normally being used for charging the Redox Flow Battery to assist in charging the actual EV.

This feature allows for relay switching for selecting a charging target. During the time that there is no EV at the pump, the Redox Battery can be selected and continually charged. As soon as the EV is ready to be charged, the system can switch the selection over to provide maximum charge to the EV by delivering the power that was going to the energy reservoir to the EV.

It is noted that the charger 43' (FIG. 8) can comprise the AC TO DC POWER CONVERTER 43 shown in FIG. 1 along with other electrical components or parts to configure the charger 43' for charging the electric reservoir 26. Alternatively, the charge 43' can be a different type of charger compared to the AC TO POWER CONVERTER 43.

Figure 9:
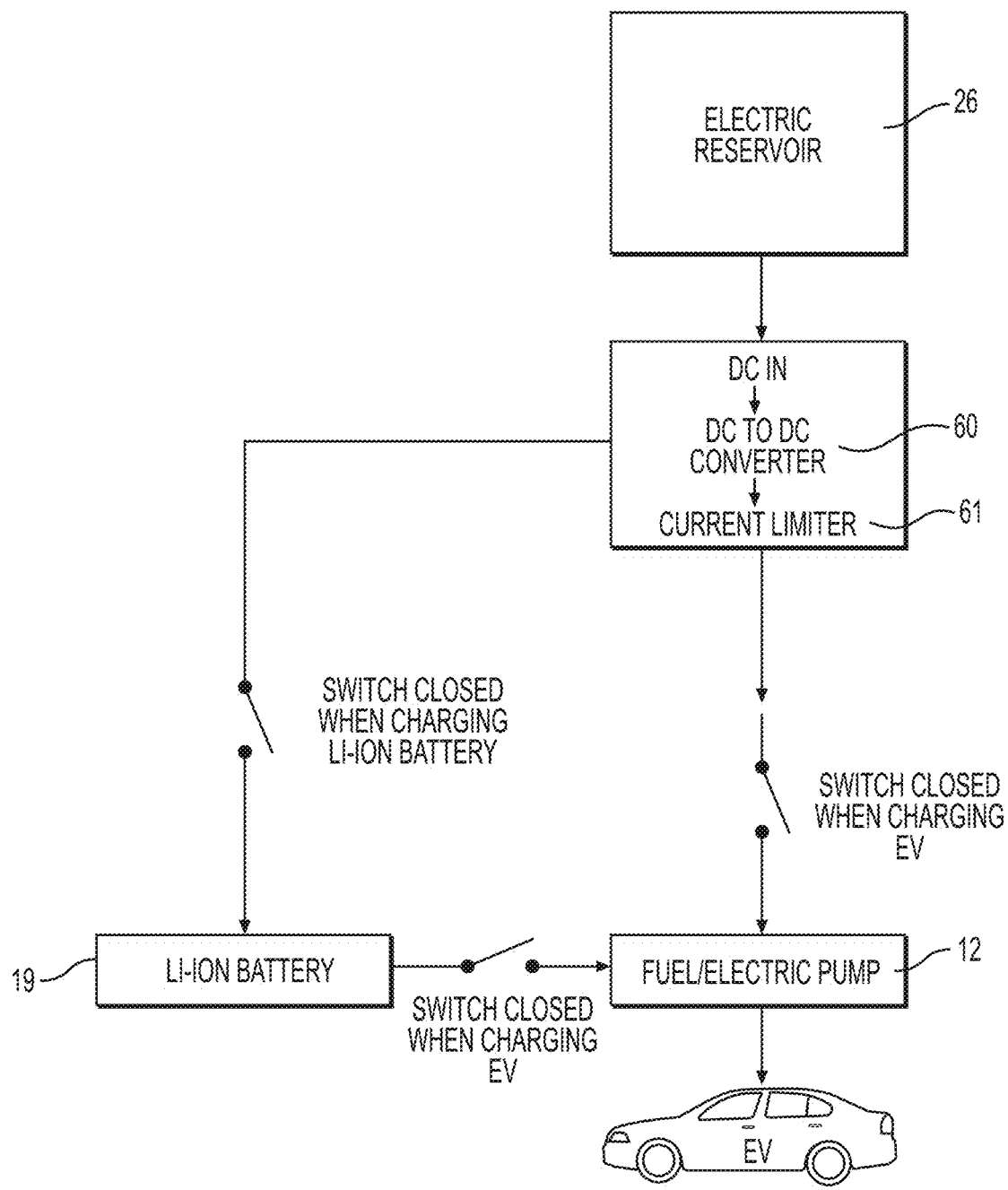
FIG. 9 is a diagrammatic view showing power sharing of the charging an EV from the electric reservoir and/or Li-ion battery of the fuel/electric pump.
Figure 10:
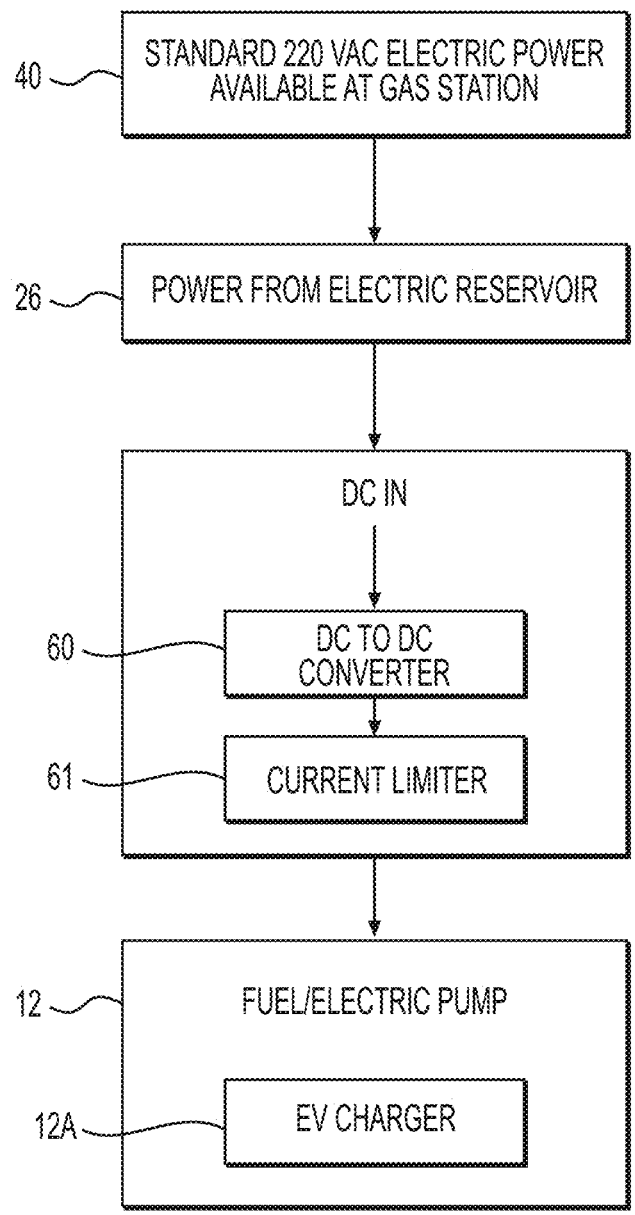
FIG. 10 is a flow chart showing power flow from the electric reservoir (e.g. flow battery, Li-ion battery, power storage capacitors, fuel cells) to the fuel/electric pump comprising a fuel pump and an EV charger.

This type of feature can be similarly applied to the fuel/electric pump 12, as shown in FIG. 9. The DC power from the electric reservoir 26 is directed to the DC-DC converter 60. The DC-DC power from the DC-DC converter 60 can be selectively used to charge the Li-ion battery 19 or can be used to charge the EV being charged by the fuel/electric pump 12. Alternatively, power from the DC-DC converter 60 and the Li-ion battery 19 can simultaneously be used to charge the EV due to the switching arrangement shown in FIG. 9.

The features of FIGS. 8 and 9 can be separate or combined together into the fuel/electric station 10.

Fuel/Electric Pump

The fuel/electric station 10 comprises a plurality of fuel/electric pumps 12. The fuel/electric pumps 12 can be configured in at least three (3) basic modes, including 1) configured for both EV charging and fuel filling; 2) configured for EV charging only; and 3) configured for fuel filling only.

The fuel/electric pumps 12 comprises an EV charger 12A, as shown in FIGS. 10-13. The EV charger 12A comprises electrical components for charging an EV, for example, a DC-DC converter.

Modular Power Subunits

Figure 14:
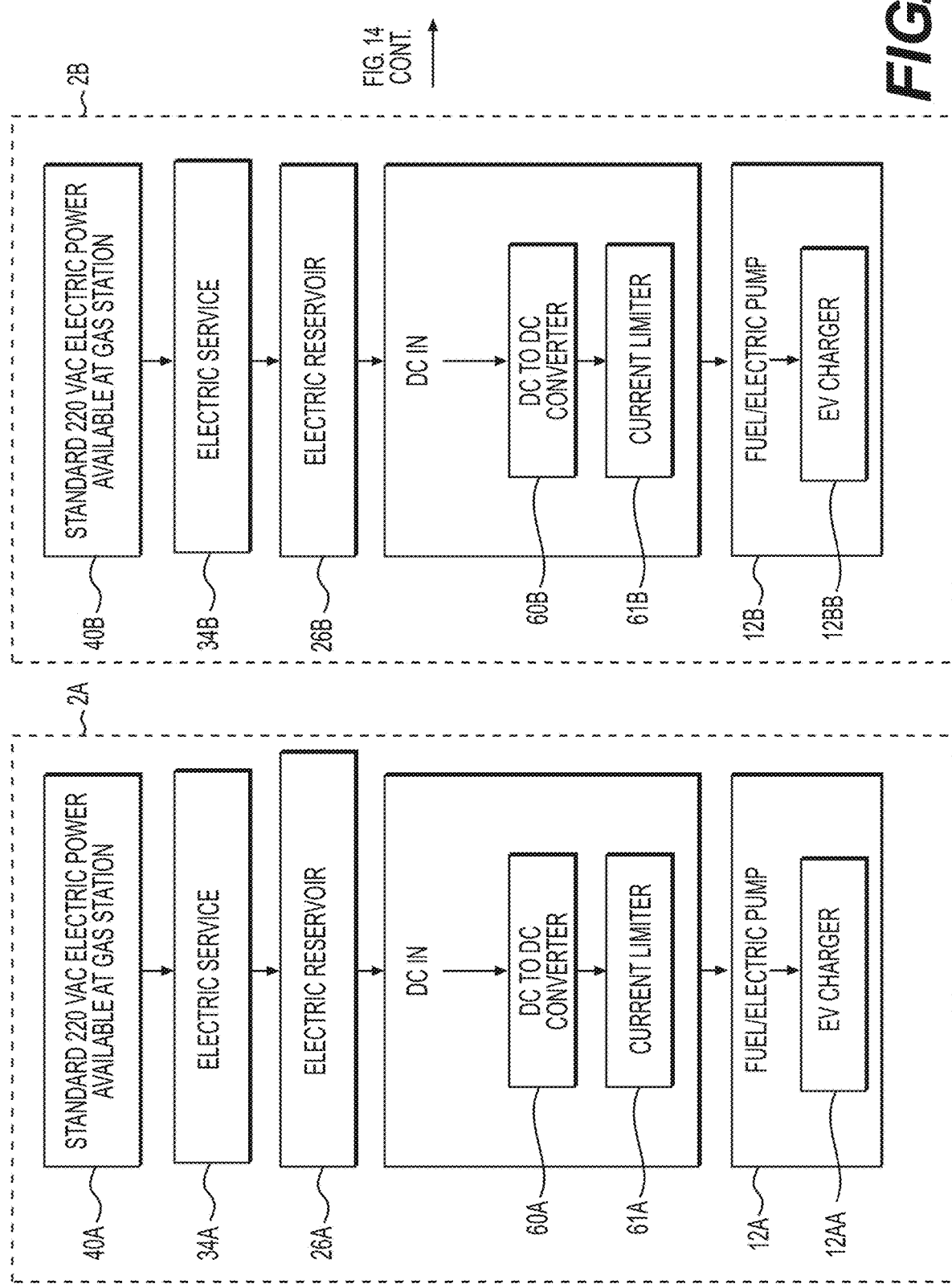
FIG. 14 is a diagrammatic view showing a fuel/electric station comprising of multiple (e.g. four (4)) modular power subunits.
Figure 14:
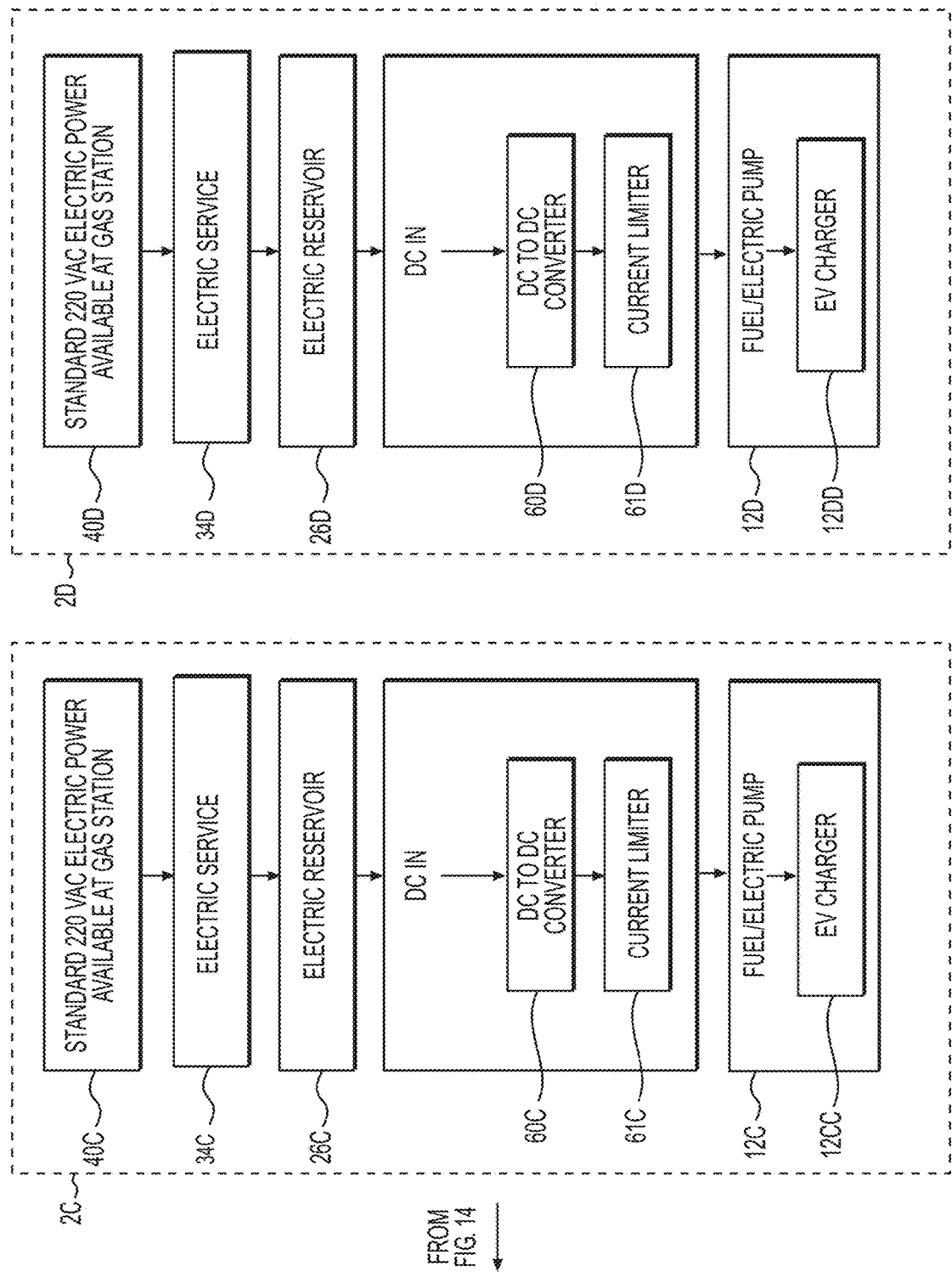

The fuel/electric station 10 comprise one or more modular power subunits. For example, the fuel/electric station 10 comprises four (4) modular power subunits 2A, 2B, 2C, 2D, as shown in FIG. 14. The modular power subunits are configured to allow one or more addition modular power subunits to be added and installed in the fuel/electric station 10 to increase the charging capacity of the fuel/electric station. For example, the fuel/electric station 10 can comprise one or more modular power subunits (e.g. one (1) to one-hundred (100) modular power subunits 2 installed at one or more fuel/electric stations 10 located at one or more interconnected sites. For example, many modular power subunits can be supplied to a parking garage or interconnected parking garages to accommodate charging a large number or fleet of electrical vehicles.

The modular power subunits 2A, 2B, 2C, 2D can be supplied power from one or more power sources (e.g. one or more power supply lines from power grid, power stations, power generators, solar panels, wind power generators, power storage facilities or devices). For example, the modular power subunits 2A, 2B, 2C, 2D are provided power from four power sources 40A, 40B, 40C, 40D, as shown in FIG. 14 that are the same power source or different power sources.

The four (4) modular power subunits 2A, 2B, 2C, 2D, as shown in FIG. 14, are each provided with separate electrical services 34A, 34B, 34C, 34D.

Figure 11:
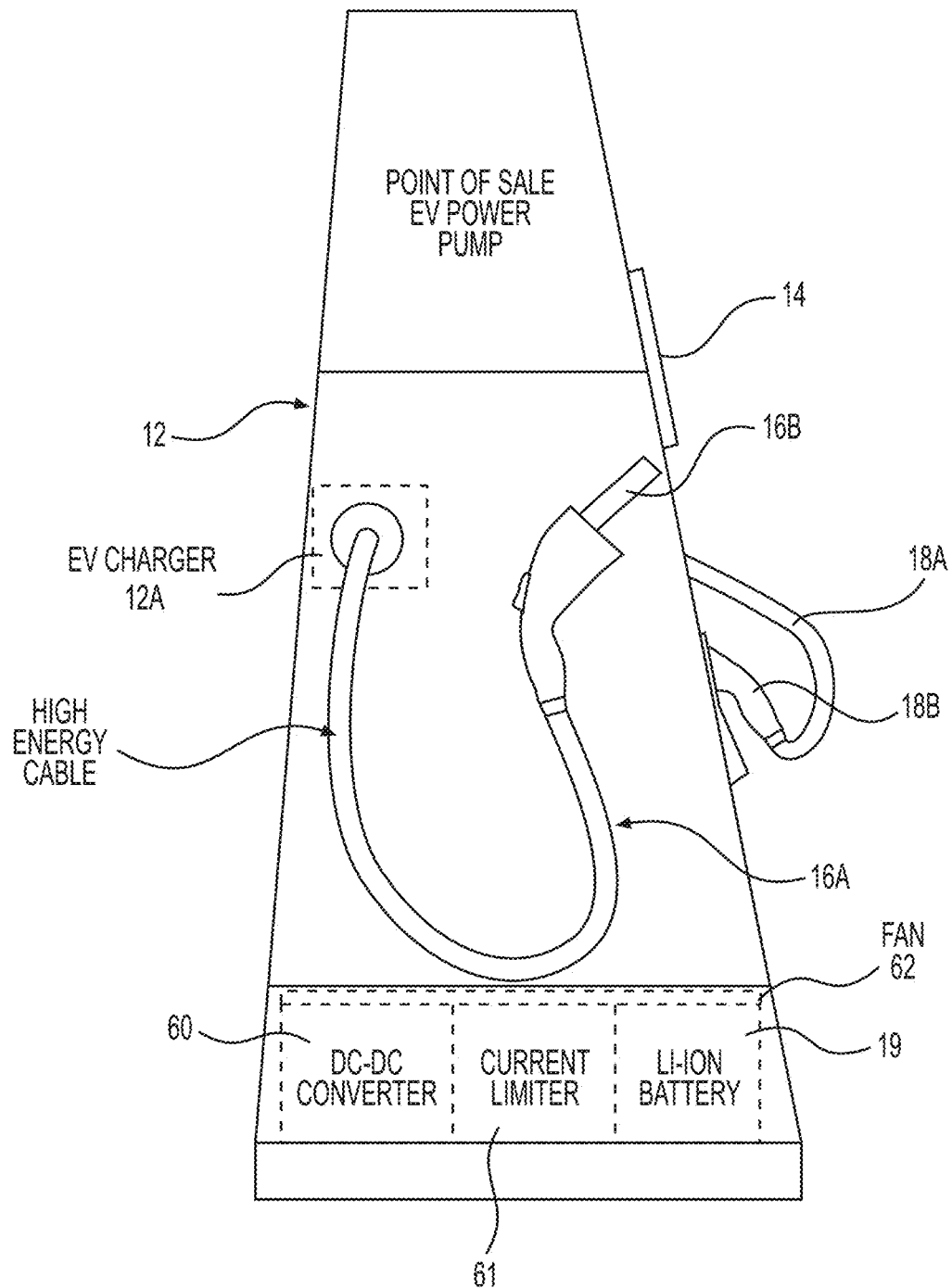
FIG. 11 is a side elevational view of a fuel/electric pump according to the present invention comprising a fuel pump and EV charger.
Figure 12:
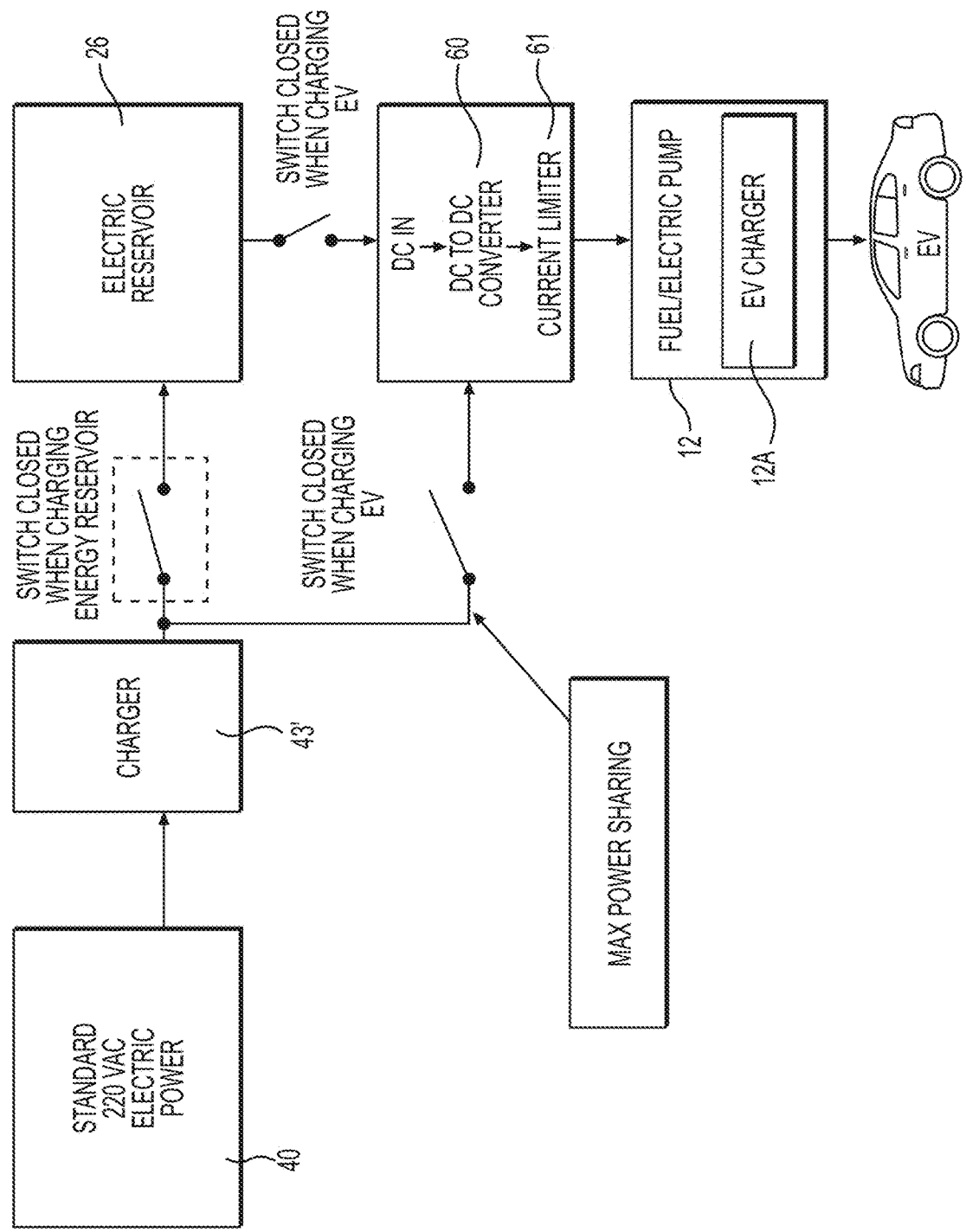
FIG. 12 is a diagrammatic view showing power sharing of the charging of an EV from a power source (e.g. power grid) and electric reservoir.
Figure 13:
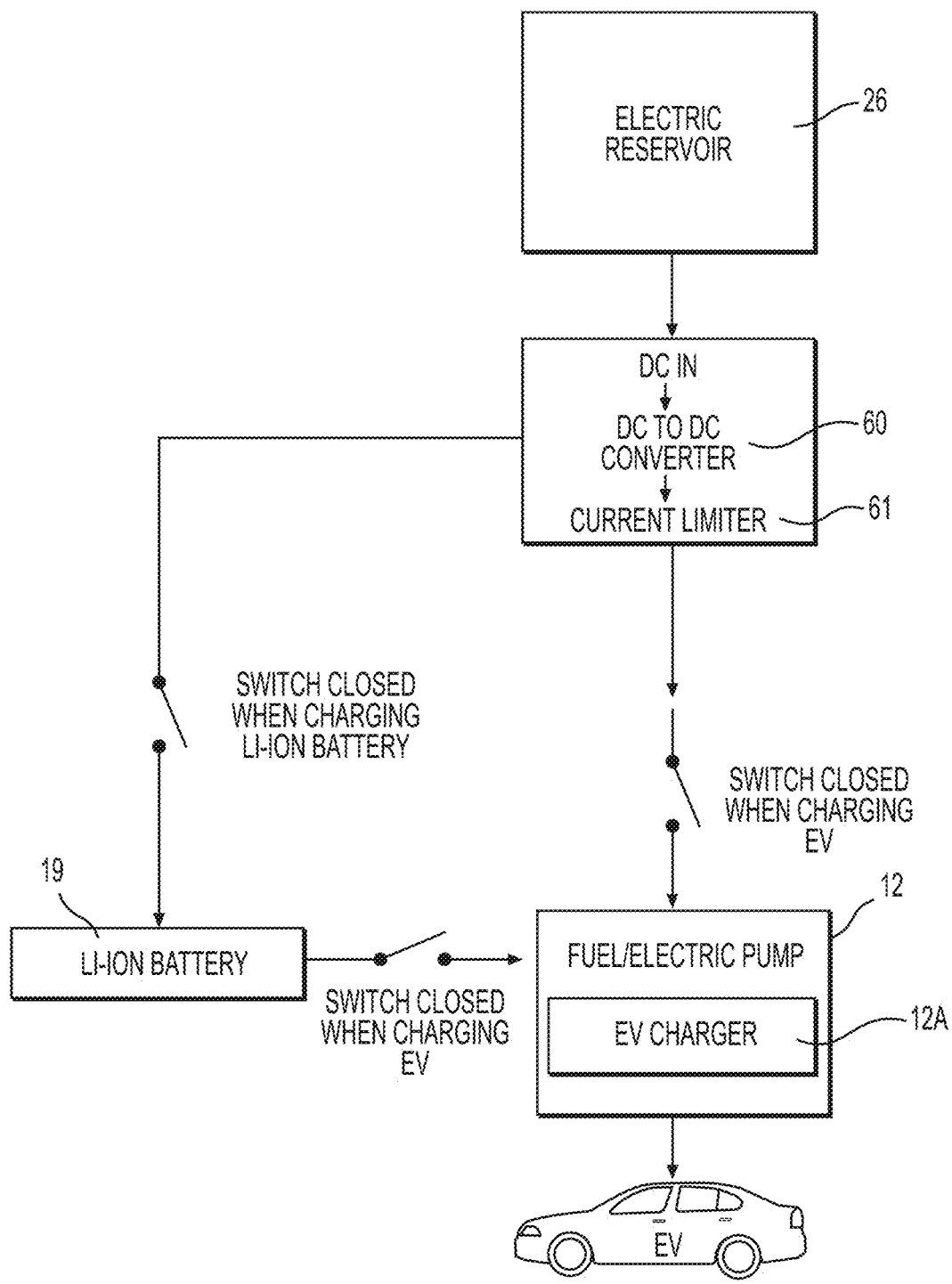
FIG. 13 is a diagrammatic view showing power sharing of the charging an EV from the electric reservoir and the Li-ion battery of the fuel/electric pump.

The modular power subunits 2A, 2B, 2C, 2D, for example, comprise or consist of one or more electric reservoirs. In FIG. 14, the modular power subunits 2A, 2B, 2C, 2D comprise, respectively, electric reservoirs 26A, 26B, 26C, 26D. The fuel/electric pumps 12A, 12B, 12C, 12D, for example, each comprise a Li-ion battery 19 (FIG. 11).

The modular subunits, for example, are provided with various AC to DC and DC to DC converters to tailor power to particular components or parts of the fuel/electric station 10. For example, a DC to DC converter is provided upstream of each electric reservoir to tailor charging power for the particular electric reservoirs.

Multiple Levels of Electric Reservoirs

Figure 15:
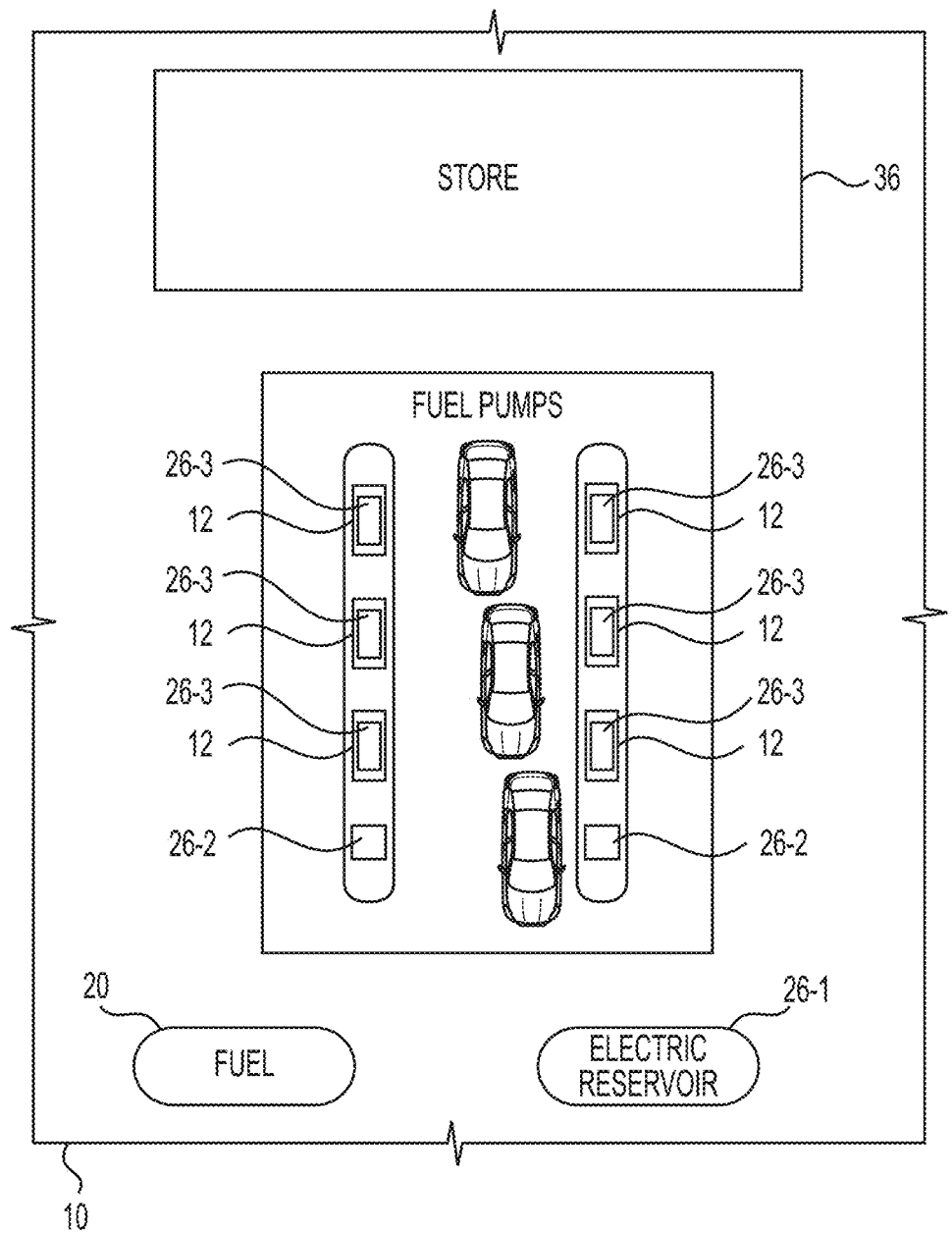
FIG. 15 is a diagrammatic view of the fuel/electric station shown in FIG. 1 enhanced with additional electric reservoirs.
Figure 16:
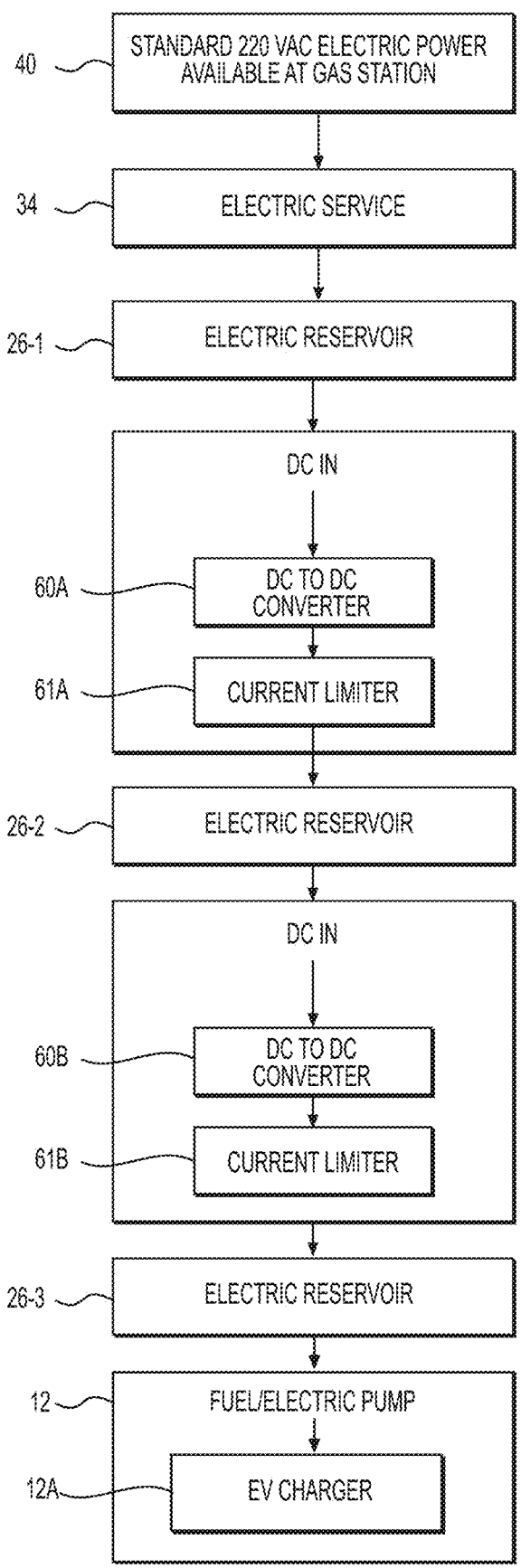
FIG. 16 is a flow chart showing power flow from the electric reservoir (e.g. flow battery, Li-ion battery, power storage capacitors, fuel cells) to the secondary electric reservoir (e.g. battery, Li-ion battery, power storage capacitors, fuel cells) to the tertiary electric reservoir (e.g. battery, Li-ion battery, power storage capacitors, fuel cells) of the fuel/electric pump (e.g. EV pump, EV charger, and/or fuel pump).

The fuel/electric station 10 comprises one or more electric reservoirs. For example, the fuel/electric station 10 comprises, for example, a primary electric reservoir 26-1, and a secondary electric reservoir 26-2, as shown in FIGS. 15 and 16. As a further example, the fuel/electric station 10 comprises a primary electric reservoir 26-1, a secondary electric reservoir 26-2, and a tertiary electric reservoir 26-3, as shown in FIGS. 15 and 16. An additional layer(s) of electric reservoirs (e.g. four or more) can be provided at the fuel/electric station 10 to provide the fuel/electric station 10 with additional electric power storage capacity, power redundancy, and power switching of one or more electric reservoirs to a particular fuel/electric pump 12. For example, the various electric reservoirs alone or in combination can be switched on to a particular fuel/electric pump 12 to meet charging demand at the particular fuel/electric pump 12 and all other fuel/electric pumps in use. A computer control system is provided to monitor the demand at each fuel/electric pump 12 and switch appropriate power to meet the demand of each fuel/electric pump 12, for example, at programmed times or in real time.

Communications

Communications is required between the EV Charger and the vehicle. Communications standards have been already created for the EV industry such as IEC 61851-21, IEC 61851-23, IEC 61851-24, ISO 15118, PLC and more.

Hardware and software will be integrated to support one or more of these standards to allow for proper handshaking between the EV Charger and the vehicle. This hardware/software will support Digital communication, digitally encoded information exchanged between a d.c. EV charging station and an EV, as well as the method by which it is exchanged.

Figure 17:
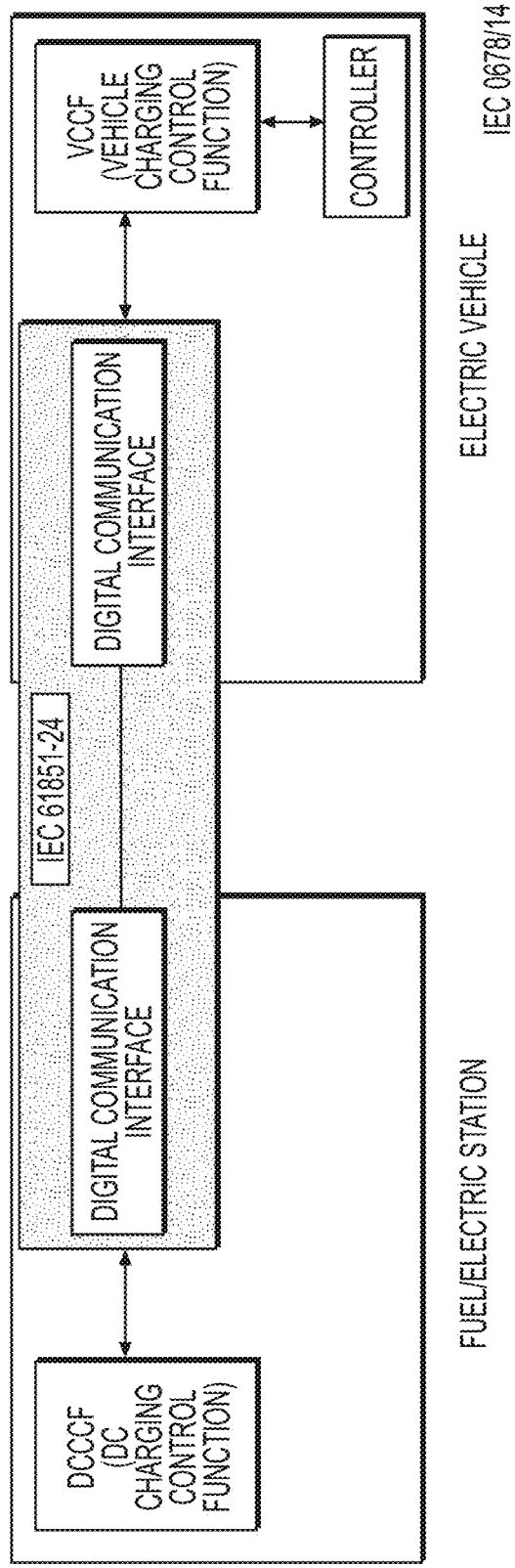
FIG. 17 is a block diagram of a communication system for the fuel/electric station according to the present invention for communicating with electric vehicles being recharged.

The Digital communication between the d.c. EV charging station (e.g. fuel/electric station 10) and an electric vehicle for control of d.c. charging is shown in FIG. 17.

Figure 18:
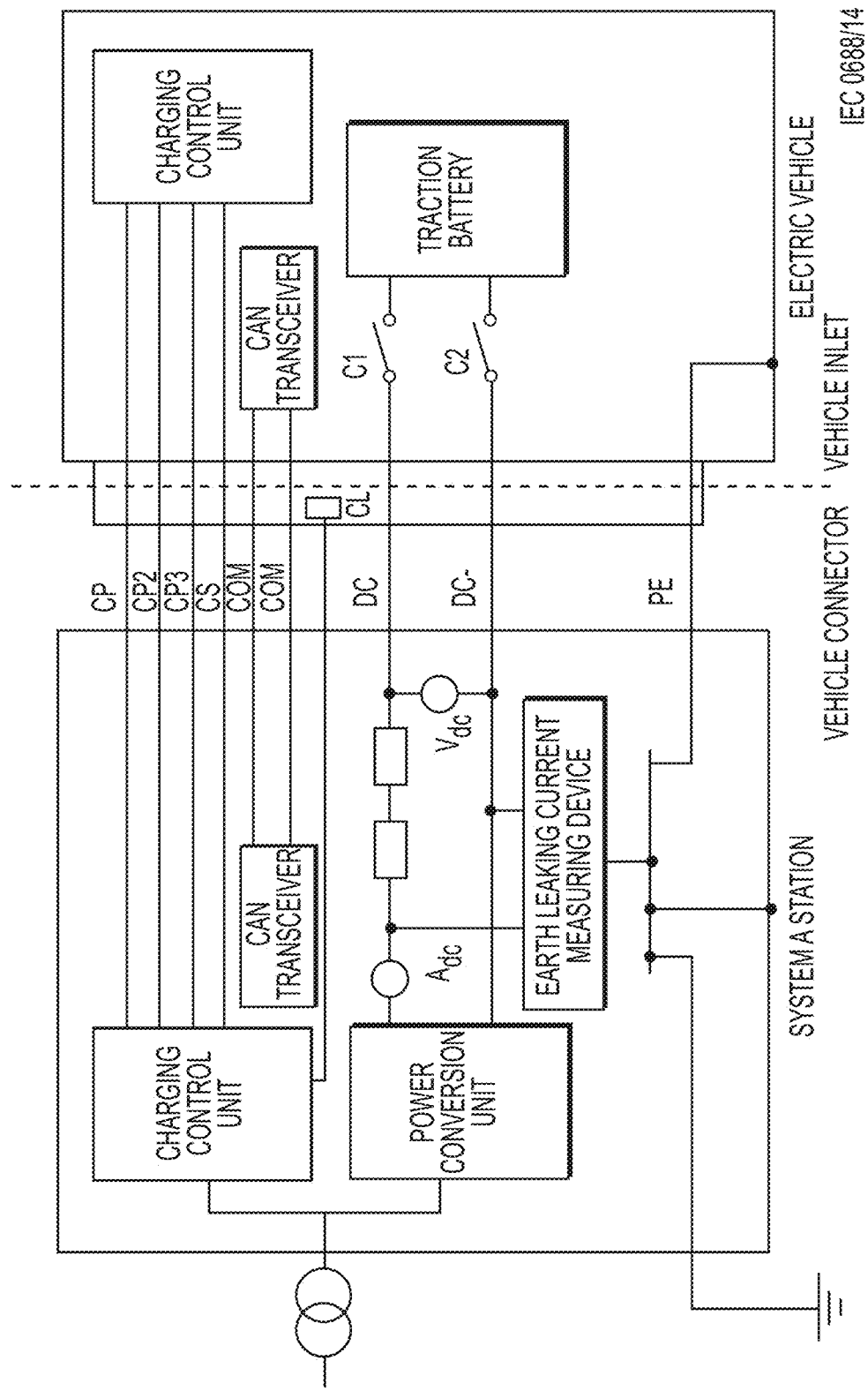
FIG. 18 is a diagram of the communication interface of the communication system shown in FIG. 16.

A schematic block diagram example of system A is shown in FIG. 18. The interface circuit between the station and the electric vehicle for charging control is provided for digital communication with the vehicle.

The invention claimed is:

1. An electric vehicle (EV) charging station for charging an electric vehicle (EV), the EV charging station comprising:
   a power source;
   an electrical service receiving power from the power source;
   a primary electric reservoir receiving power from the electrical service;
   a secondary electric reservoir receiving power from the primary electric reservoir; and
   a first EV charger receiving power from the secondary electric reservoir,
   wherein the electrical service is a plurality of electrical services, the primary electric reservoir is a plurality of primary electric reservoirs receiving power, respectively, from the plurality of electrical services, the secondary electric reservoir is a plurality of secondary electric reservoirs receiving power, respectively, from the plurality of primary electric reservoirs, and the EV charger is a plurality of EV chargers receiving power, respectively, from the plurality of secondary electric reservoirs.

2. An electric vehicle (EV) charging station for charging an electric vehicle (EV), the EV charging station comprising:
   a power source;
   an electrical service receiving power from the power source;
   a primary electric reservoir receiving power from the electrical service;
   a secondary electric reservoir receiving power from the primary electric reservoir;
   a tertiary electric reservoir receiving power from the secondary electric reservoir; and
   a first EV charger receiving power from the tertiary electric reservoir,
   wherein the electrical service is a plurality of electrical services, the primary electric reservoir is a plurality of primary electric reservoirs receiving power, respectively, from the plurality of electrical services, the secondary electric reservoir is a plurality of secondary electric reservoirs receiving power, respectively, from the plurality of electric primary electric reservoirs, the tertiary electric reservoir is a plurality of tertiary electric reservoirs receiving power, respectively, from the plurality of secondary electric reservoirs, and the EV charger is a plurality of EV chargers receiving power, respectively, from the plurality of tertiary electric reservoirs.

3. The EV charging station according to claim 1, further comprising a tertiary electric reservoir receiving power from the secondary electric reservoir.

4. The EV charging station according to claim 1, further comprising an AC to DC power converter receiving AC power from the electrical service and converting the AC power to DC power.

5. The EV charging station according to claim 4, further comprising a first DC to DC power converter receiving DC power from the AC to DC converter and converting the DC power to DC power for supplying DC power to the primary electric reservoir.

6. The EV charging station according to claim 4, further comprising a second DC to DC power converter receiving DC power from the primary electric reservoir and converting the DC power to DC power for supplying DC power to the secondary electric reservoir.

7. The EV charging station according to claim 5, further comprising a third DC to DC power converter receiving DC power from the secondary electric reservoir and converting the DC power to DC power for supplying DC power to the EV charger.

8. The EV charging station according to claim 6, wherein the EV charger comprises a fourth DC to DC power converter for converting DC power to DC power for supplying DC power to the EV.

9. The EV charging station according to claim 2, further comprising an AC to DC power converter receiving AC power from the electrical service and converting the AC power to DC power.

10. The EV charging station according to claim 9, further comprising a first DC to DC power converter receiving DC power from the AC to DC converter and converting the DC power to DC power for supplying DC power to the primary electric reservoir.

11. The EV charging station according to claim 10, further comprising a second DC to DC power converter receiving DC power from the primary electric reservoir and converting the DC power to DC power for supplying DC power to the secondary electric reservoir.

12. The EV charging station according to claim 11, further comprising a third DC to DC power converter receiving DC power from the secondary electric reservoir and converting the DC power to DC power for supplying DC power to the tertiary electric reservoir.

13. The EV charging station according to claim 11, further comprising a third DC to DC power converter receiving DC power from the tertiary electric reservoir and converting the DC power to DC power for supplying DC power to the EV charger.

14. The EV charging station according to claim 6, wherein the EV charger comprises a fifth DC to DC power converter for converting DC power to DC power for supplying DC power to the EV.

15. The EV charging station according to claim 1, wherein the primary electric reservoir comprises a flow battery.

16. The EV charging station according to claim 1, wherein the primary electric reservoir comprises a Li-ion battery.

17. The EV charging station according to claim 1, wherein the primary electric reservoir comprises an electrical storage capacitor.

18. The EV charging station according to claim 1, wherein the EV charging station is configured to selectively or simultaneously provide power for charging the EV from the electrical source, primary electric reservoir and/or the secondary electric reservoir.

19. The EV charging station according to claim 2, wherein the EV charging station is configured to selectively or simultaneously provide power for charging the EV from the electrical source, the primary electric reservoir, second electric reservoir and/or the tertiary electric reservoir.

20. An electric vehicle (EV) charging station for charging an electric vehicle (EV), the EV charging station comprising:
 a power source;
 an electrical service receiving power from the power source;
 a primary electric reservoir receiving power from the electrical service;
 a secondary electric reservoir receiving power from the primary electric reservoir;
 a first EV charger receiving power from the secondary electric reservoir;
 a first AC to DC power converter receiving AC power from the electrical service and converting the AC power to DC power; and
 a second DC to DC power converter receiving DC power from the primary electric reservoir and converting the DC power to DC power for supplying DC power to the secondary electric reservoir.

21. The EV charging station according to claim 20, wherein the EV charger comprises a fourth DC to DC power converter for converting DC power to DC power for supplying DC power to the EV.

22. The EV charging station according to claim 20, wherein the EV charger comprises a fifth DC to DC power converter for converting DC power to DC power for supplying DC power to the EV.

23. An electric vehicle (EV) charging station for charging an electric vehicle (EV), the EV charging station comprising:
 a power source;
 an electrical service receiving power from the power source;
 a primary electric reservoir receiving power from the electrical service;
 a secondary electric reservoir receiving power from the primary electric reservoir;
 a first EV charger receiving power from the secondary electric reservoir;
 a first AC to DC power converter receiving AC power from the electrical service and converting the AC power to DC power;
 a first DC to DC power converter receiving DC power from the AC to DC converter and converting the DC power to DC power for supplying DC power to the primary electric reservoir; and
 a third DC to DC power converter receiving DC power from the secondary electric reservoir and converting the DC power to DC power for supplying DC power to the EV charger.

24. An electric vehicle (EV) charging station for charging an electric vehicle (EV), the EV charging station comprising:
 a power source;
 an electrical service receiving power from the power source;
 a primary electric reservoir receiving power from the electrical service;
 a secondary electric reservoir receiving power from the primary electric reservoir;
 a tertiary electric reservoir receiving power from the secondary electric reservoir;
 a first EV charger receiving power from the tertiary electric reservoir;

an AC to DC power converter receiving AC power from the electrical service and converting the AC power to DC power; and a first DC to DC power converter receiving DC power from the AC to DC converter and converting the DC power to DC power for supplying DC power to the primary electric reservoir.

25. The EV charging station according to claim 24, further comprising a second DC to DC power converter receiving DC power from the primary electric reservoir and converting the DC power to DC power for supplying DC power to the secondary electric reservoir.

26. The EV charging station according to claim 25, further comprising a third DC to DC power converter receiving DC power from the secondary electric reservoir and converting the DC power to DC power for supplying DC power to the tertiary electric reservoir.

27. The EV charging station according to claim 25, further comprising a third DC to DC power converter receiving DC power from the tertiary electric reservoir and converting the DC power to DC power for supplying DC power to the EV charger.

\* \* \* \* \*